United States Patent Office 3,378,561
1-β-ARYLTHIOETHYLTETRAHYDRO-
ISOQUINOLINES
Thomas A. Montzka, Manlius, N.Y., assignor to Bristol-
Myers Company, New York, N.Y., a corporation of
Delaware
No Drawing. Continuation-in-part of applications Ser.
No. 440,928, Mar. 18, 1965, and Ser. No. 520,861,
Jan. 17, 1966. This application May 18, 1966, Ser.
No. 550,961
14 Claims. (Cl. 260—286)

ABSTRACT OF THE DISCLOSURE

1 - β-arylthioethyl-2-methyl-6,7-dimethoxy-1,2,3,4-tetrahydroisoquinolines, wherein aryl is substituted phenyl, pyridyl, thiazolyl or thienyl, are useful as analgesic and muscle-relaxing agents. The most preferred embodiment of the present invention is the compound known as 1-(β-p - chlorothiophenoxyethyl) - 6,7 - dimethoxy - 2-methyl-1,2,3,4-tetrahydroisoquinoline.

Cross references to related applications

This application is a continuation-in-part of my prior, copending applications Ser. No. 440,928 filed Mar. 18, 1965 and Ser. No. 520,861 filed Jan. 17, 1966 both now abandoned.

Background of the invention (1) Field of the invention. The 1-β-arylthioethyl-2-methyl - 6,7 - dimethoxy - 1,2,3,4-tetrahydroisoquinolines of the present invention are useful as analgesics and muscle relaxants.

(2) Description of the prior art: The compounds of the present invention are new and novel. They are not disclosed, taught or anticipated by the prior art as medicinally active compounds.

Summary of the invention

The compounds of the present invention are characterized as having the formula

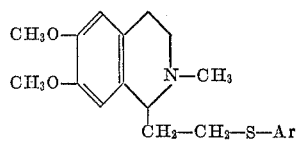

where Ar is a member selected from the group consisting of

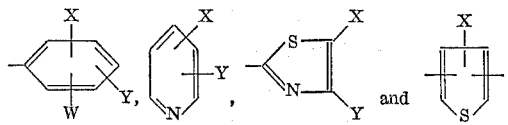

wherein W, X and Y are each a member selected from the group consisting of hydrogen, chloro, bromo, fluoro, trifluoromethyl, methyl, ethyl, methoxy and ethoxy; and the nontoxic, pharmaceutically acceptable acid addition salts thereof. Included in the present invention are the valuable chemical intermediates characterized by the formula

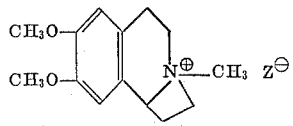

wherein Z⊖ represents one equivalent of an inert anion.

Detailed description

This invention relates to a novel series of basic chemicals and their acid addition salts which are useful analgesic and muscle-relaxing agents and, more particularly, to certain substituted 1 - β - arylthioethyl - 2 - methyl-6,7-dimethoxy-1,2,3,4-tetrahydroisoquinolines.

There is provided by the present invention a member selected from the group consisting of compounds of the formula

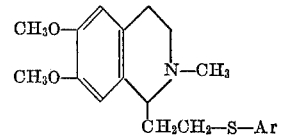

wherein Ar is a member selected from the group consisting of

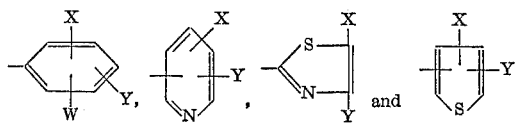

wherein W, X and Y are each a member selected from the group consisting of hydrogen, chloro, bromo, fluoro, trifluoromethyl, methyl, ethyl, methoxy and ethoxy; and nontoxic, pharmaceutically acceptable acid addition salts thereof.

The preferred embodiments of the present invention are the compounds of the formula

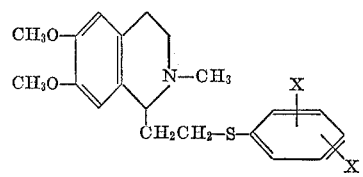

wherein X and Y have the meaning set forth above and their nontoxic, pharmaceutically acceptable salts and, particularly, the two compounds (and their salts) of the formula

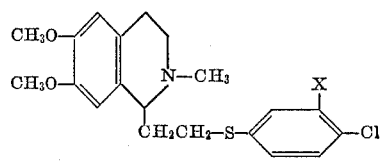

wherein X is hydrogen or chloro, which are exceptionally effective analgesic agents.

Included within the present invention are the acid addition salts prepared by reaction of these basic compounds with organic and inorganic acids such as hydrochloric acid, hydrobromic acid, sulfuric acid, phosphoric acid, acetic acid, maleic acid, tartaric acid, citric acid, sulfamic acid, glycolic acid, succinic acid, asorbic acid and the like.

The term "(lower)alkyl" as used herein refers to straight and branched chain saturated monovalent aliphtic hydrocarbon radicals having from one to ten carbon atoms inclusive, e.g. methly, ethyl, propyl, isopropyl, butyl, normal and secondary and tertiary butyl, amyl, decyl, etc.

The compounds of the present invention are prepared as shown schematically below by reacting the appropriate β-arylthiopropionic acid with 3,4-dimethoxyphenethylamine to form the amide, cyclizing the amide, as with phosphoryl chloride, to the 1-substituted-dehydroisoquinoline, reducing the last, as with the borohydride, to the corresponding tetrahydroisoquinoline and finally methylating at the 2-position, thus:

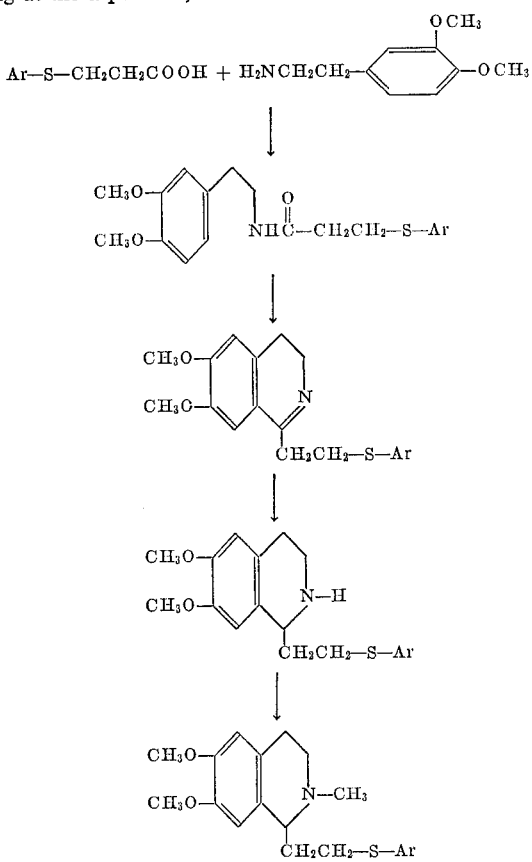

An alternate procedure as exemplified below follows the scheme:

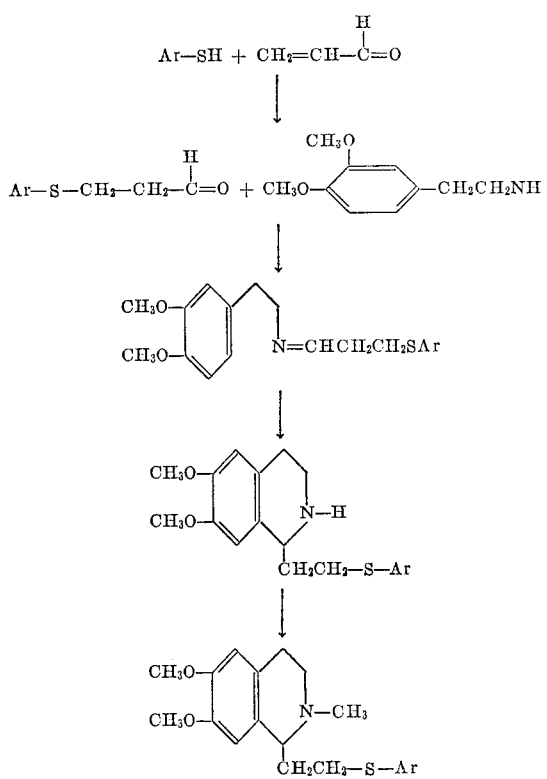

Thus the starting β-arylmercaptopropionic acids may be prepared by the methods reported in the literature, e.g. according to Krollpfeiffer et al., Ber. 58, 1654-1680 (1925) or Stewart et al, J. Org. Chem. 14, 1111–1117 (1949) and the alternative starting β-arylthiopropionaldehydes may be prepared according to Chemical Abstracts 59, 8635e (1963).

The β-arylmercaptopropionic acids are used to acylate 3,4-dimethoxyphenethylamine in the normal manner and the amide so produced is cyclized as with oxides or chlorides of phosphorus and reduced as with alkali metal aluminum hydride or borohydride to the tetrahydroisoquinoline as exemplified below or in accordance with the procedures on pp. 250 and 254 of volume IV, Richter, The Chemistry of Carbon Compounds, Elsevier Publishing Co., Inc., New York, N.Y., 1947 and on pp. 347–353 of volume IV, Elderfield, Heterocyclic Compounds, Wiley, New York, 1952, and U.S. Patent 2,683,146 and Great Britain 926,493.

The tetrahydroisoquinoline is then methylated in the 2-position by the usual techniques used to methylate aliphatic secondary amines, e.g. with formic acid and formaldehyde. Thus, the introduction of the methyl group may be carried out according to known methods, for example, by treating the starting material, i.e. the 1,6,7-trisubstituted-1,2,3,4-tetrahydroisoquinoline with a one molar equivalent of a reactive ester of methanol. A reactive ester of methanol is particularly one formed with a strong inorganic acid, e.g. hydrochloric, hydrobromic, hydriodic, sulfuric acid and the like, or a strong organic sulfonic acid, e.g. methane sulfonic, ethane sulfonic, 2-hydroxyethane sulfonic, p-toluene sulfonic acid and the like; reactive esters are therefore, for example the methyl halides, e.g. chloride, bromide or iodide, dimethyl sulfate methyl p-toluene sulfonate and the like. The reactive ester is preferably reacted with the starting material in the form of a metal compound, particularly of an alkali metal, e.g. lithium, sodium and the like compound; the latter is prepared by treatment with a suitable reagent capable of forming such compound, for example, with an alkali metal hydride, e.g. sodium hydride and the like, or any other equivalent reagent. The formation of the meal compound, as well as the treatment of the latter with the reactive ester is preferably carried out in the presence of a suitable inert solvent, if necessary, while cooling or at an elevated temperature and/or in a closed vessel and/or in the atmosphere of an inert gas, e.g., nitrogen.

The methyl group may also be introduced according to other methods, for example, by treating the 1,6,7-trisubstituted-1,2,3,4-tetrahydroisoquinoline starting material with formaldehyde in the presence of a reducing reagent, e.g. formic acid, hydrogen in the presence of a hydrogenation catalyst, e.g. palladium and the like, or any other suitable reducing reagent.

In another and very valuable procedure the compounds of the present invention are prepared by the reaction of a compound of the formula H-S- Ar wherein Ar is defined above (and preferably a metal salt thereof such as the sodium or potassium salt) with a reagent of the formula

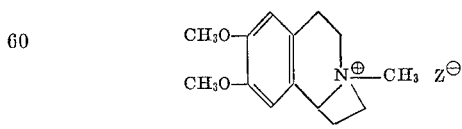

wherein Z⊖ represents one equivalent of an inert anion. The preferred anions include the halides (chloride, bromide and iodide), sulfate, (lower)alkyl sulfate and sulfonates, such as p-toluene-sulfonate and p-bromobenzene-sulfonate, but other anions are equally useful and need not even be nontoxic as the anion does not appear in the final pharmaceutical product prepared by reaction of this reagent with, for example, a compound of the formula Ar —S-NA as illustrated in Example 8 below.

These intermediate quaternary salts are prepared, in one procedure, by the treatment with alkali, e.g. $Na_2CO_3$, of the reaction product of the alcohol of the formula

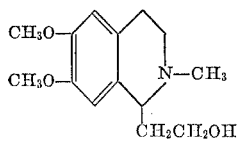

with $SOCl_2$, $SOBr_2$, $(CH_3)_2SO_4$, $p-CH_3C_6H_4SO_2Cl$, $p-BrC_6H_4SO_2Cl$ or the like. The anion $Z^\ominus$ is of little consequence in such active intermediates since the chemical reactivity resides in the cation. The anion $Z^\ominus$ is defined as an inert anion to exclude unusual anions containing additional substituents, such as phenolic hydroxyl groups, capable of further reaction with these quaternary salts. As thus prepared, $Z^\ominus$ may be chloride, bromide, methanesulfonate, ethanesulfonate, p-toluenesulfonate, p-bromobenzenesulfonate or the like. By exchange reactions of the conventional type, $Z^\ominus$ can be replaced by other anions, e.g. phosphate, fluoride, malate, succinate, fumarate, oleate, etc. The salts obtained through these variations of $Z^\ominus$ may in some cases have special advantages due to solubility, ease of crystallization, etc. but these are all subsidiary to the chemical reactivity of the compound which is independent of the character of $Z^\ominus$.

In a preferred embodiment the compounds of the present invention are prepared by the reaction of a compound of the formula Ar—S—H wherein Ar is as defined above (and preferably a metal salt thereof such as the sodium or potassium salt) with a reagent of the formula

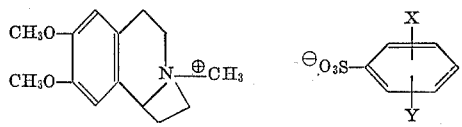

wherein X and Y are each hydrogen, chloro, bromo, fluoro, trifluoromethyl, nitro, (lower)alkyl or (lower)alkoxy. This reaction is preferably conducted in an inert, organic solvent, e.g. ethanol, at a temperature from 20° C. to 100° C.

The preparation of this reagent is illustrated for the case where X is hydrogen and Y is para-bromo as follows:

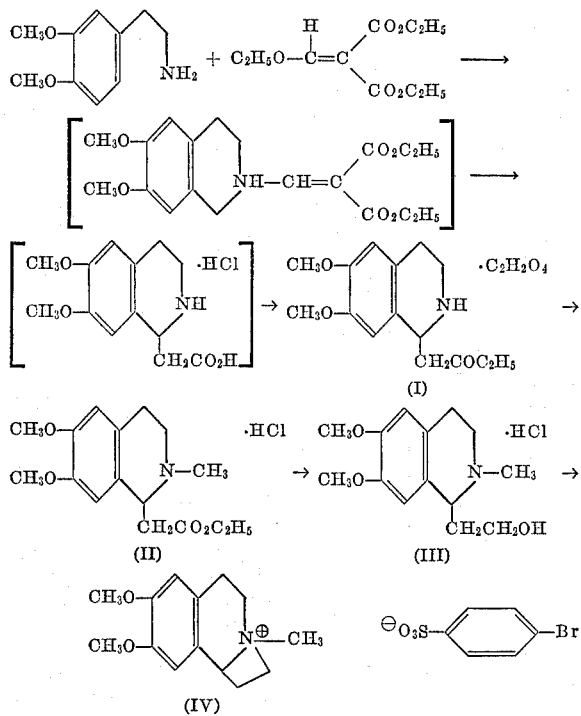

6,7 - Dimethoxy - 1,2,3,4 - tetrahydroisoquinoline - 1 - acetic acid ethyl ester oxalate (I) [A. L. Bluhm and W. J. Gensler, J. Org. Chem., 21, 336–339 (1956)].—To a stirred solution of 216.9 g. (1 mole) distilled diethyl ethoxymethylenemalonate in 1 liter of absolute ethanol was added slowly 181.2 g. (1 mole) of distilled homoveratrylamine in a nitrogen atmosphere. The reaction mixture was stirred for 16 hours at room temperature and then concentrated to dryness. The resultant oil was taken up in 2 liters of 24% hydrochloric acid, heated on a steam bath for 4 hours and then concentrated to dryness to give a yellow oil. This oil was taken up in 1 liter of absolute ethanol, filtered to remove insoluble material, saturated with gaseous hydrogen chloride with cooling, stored at room temperature for one day and then concentrated to dryness to give an oil. This was retaken up in one liter of absolute ethanol, saturated with gaseous hydrogen chloride with cooling, stored at room temperature for one day and again concentrated to dryness. The resultant brown oil was basified with aqueous sodium carbonate, extracted with chloroform, dried over sodium sulfate, and concentrated to an oil which gave a crystalline oxalate with 90 g. of oxalic acid from acetone. One recrystallization from 95% ethanol yielded 228.1 g. (61.7%) of 6,7 - dimethoxy-1,2,3,4-tetrahydroisoquinoline-1-acetic acid ethyl ester oxalate. Several recrystallizations from 95% ethanol gave an analytical sample M.P. 136–164° C. (poorly defined).

Analysis.—Calcd. for $C_{15}H_{21}NO_4 \cdot C_2H_2O_4$: C, 55.28; H, 6.26; N, 3.79. Found: C, 55.28; H, 6.25; N, 3.81.

6,7 - dimethoxy - 2 - methyl - 1,2,3,4 - tetrahydroisoquinoline-1-acetic acid ethyl ester hydrochloride (II) [A. Brossi et al., Helv. Chim. Acta. 43, 583–593 (1960)].—To 3.8 g. (0.0135 mole) of 6,7-dimethoxy-1,2,3,4-tetrahydroisoquinoline-1-acetic acid ethyl ester, obtained from the oxalate by neutralization with sodium carbonate, was added 1.2 ml. of 40% formaldehyde and 3.6 ml. of 88% formic acid. The reaction mixture was heated on a steam bath for 2 hours. Three ml. of 6 N hydrochloric acid were added and the solution was concentrated to dryness to yield 4.5 g. (100%) of crude crystalline 6,7-dimethoxy-2-methyl-1,2,3,4-tetrahydroisoquinoline-1-acetic acid ethyl ester hydrochloride. One recrystallization from absolute ethanol gave analytical material M.P. 179–183° C.

Analysis.—Calc'd for $C_{16}H_{23}NO_4 \cdot HCl$: C, 58.26; H, 7.34; N, 4.25. Found: C, 58.36; H, 7.38; N, 4.32.

6,7 - dimethoxy - 1 - β - hydroxyethyl - 2 - methyl-1,2,3,4-tetrahydroisoquinoline hydrochloride (III).—To a stirred suspension of 7.6 g. (0.2 mole) of lithium aluminum hydride in 100 ml. of tetrahydrofuran was added slowly 58.5 g. (0.2 mole) of 6,7-dimethoxy-2-methyl-1,2,3,4-tetrahydroisoquinoline-1-acetic acid ethyl ester (obtained from the hydrochloride by neutralization with sodium carbonate) in 150 ml. of tetrahydrofuran. The suspension was refluxed for four hours. Twenty-five ml. of water were cautiously added and the suspension was stirred with warming until white. Anhydrous sodium sulfate was added and the solids removed by filtration. The filtrate was concentrated to dryness to give 49.9 g. (99.3%) of an oil which gave crystalline 6,7-dimethoxy-1 - β - hydroxyethyl - 2 - methyl - 1,2,3,4 - tetrahydroisoquinoline hydrochloride from acetone. One recrystallization from absolute ethanol yielded 42.6 g. of analytical material M.P. 179–182° C.

Analysis.—Calc'd for $C_{14}H_{21}NO_3 \cdot HCl$: C, 58.43; H, 7.71; N, 4.87. Found: C, 58.26; H, 7.88; N, 4.77.

[2,1 - a]azetidino - 6,7 - dimethoxy - 2 - methyl-1,2,3,4 - tetrahydroisoquinolinium p-bromobenzenesulfonate (IV).—To a stirred solution at room temperature of 5.3 g. (.021 mole) of 6,7-dimethoxy-1-β-hydroxyethyl-2-methyl-1,2,3,4-tetrahydroisoquinoline (obtained from the hydrochloride by neutralization with sodium carbonate) in 100 ml. of chloroform was added 5.5 g. (.0216 mole) of p-bromobenzenesulfonyl chloride. Stirring was continued for four hours. Anhydrous sodium carbonate (11.2 g.) was added and stirring was continued for 16 hours. The mixture was filtered and the filtrate concentrated to give 9.6 g. (97%) of crude crystalline material. Several recrystallizations from isopropanol yielded analytically pure [2,1-a]azetidino-6,7-dimethoxy-2-methyl-1,2,3,4-tetrahydroisoquinolinium p-bromobenzenesulfonate, M.P. 182–184.5° C.

Analysis.—Calc'd for $C_{20}H_{24}BrNO_5S$: C, 51.07; H, 5.14; N, 2.98. Found: C, 51.01; H, 5.29; N, 2.92.

The compounds of the present invention contain an asymmetric carbon atom and thus normally occur as a racemic mixture of the two optical isomers. Both isomers are active and both of these isomers and mixtures thereof are included within the scope of the present invention.

As its hydrochloride salt the preferred compound of the present invention has the structure

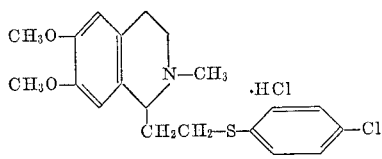

and may be named 1-(p-chlorothiophenoxyethyl)-6,7-dimethoxy-2-methyl-1,2,3,4-tetrahydroisoquinoline hydrochloride or 1-[β-(p-chlorophenylmercapto)ethyl]-6,7-dimethoxy-2-methyl-1,2,3,4-tetrahydroisoquinoline hydrochloride. This compound was tested for analgesic activity by the phenylquinone test of Sigmund et al., Proc. Soc. Expt'l. Biol. and Med., 95, 729 (1957) in which an analgesic reduces the induced writhing of the mice. At dosages of 150 and 50 mgm./kg. p.o. in mice given 50 minutes before the phenyl-p-quinone is injected, the reduction in induced writhing at the end of the first hour was found to be 89% and 72% respectively for this compound. This compound was also shown to be a potent analgesic by the standard rat-tail flick test.

The following examples will serve to illustrate the present invention but the invention is not limited thereto.

Example 1

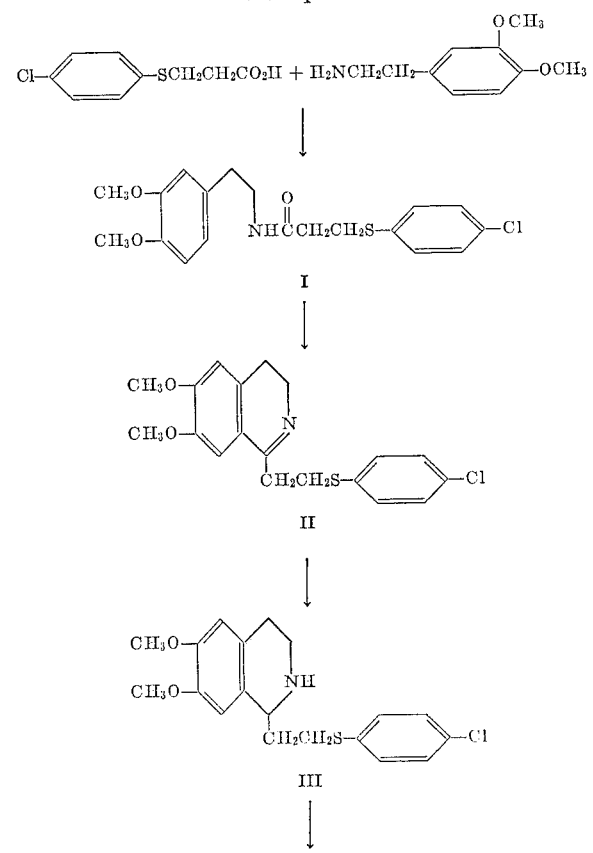

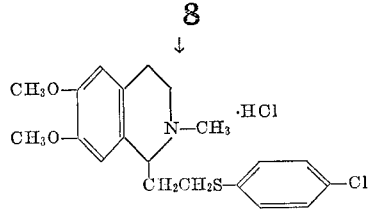

β-(-p-chlorothiophenoxy)propionic homoveratrylamide (I).—A stirred mixture of 129 g. (0.59 mole) of β-p-chlorothiophenoxy-propionic acid[1] and 108 g. (0.59 mole) of homoveratrylamine in 1½ liters of toluene was heated under reflux for 4½ days using a Dean-Stark trap to remove water. The solution was cooled to approximately 60° C., diluted with 500 ml. of dry warm "Skellysolve B" (mixed lower alkanes), and then cooled to 5° C. for crystallization. Collection of the crystals gave 178 g. of crude material. A small portion was recrystallized from acetone-water containing a few drops of acetic acid to yield an analytical sample, M.P. 82–84° C.

Analysis.—Calc'd for $C_{19}H_{22}ClNO_3S$: C, 60.07%; H, 5.84%; N, 3.68%. Found: C, 60.05%; H, 5.89%; N, 3.42%.

1-(β-p-chlorothiophenoxyethyl)-6,7-dimethoxy-3,4-dihydroisoquinoline (II).—A stirred solution of 10 g. (0.026 mole) β-p-chlorothiophenoxypropionic homoveratrylamide I and 25 ml. phosphoryl chloride in 50 ml. of toluene was heated under reflux for one hour. The solution was allowed to cool to room temperature with continued stirring for two hours. One hundred ml. of water was slowly added. The aqueous layer was separated, basified with sodium carbonate, and extracted with ethyl acetate. The ethyl acetate extracts, after drying over anhydrous sodium sulfate and concentrating to dryness, yielded 6.7 g. of crude crystalline product. Two recrystallizations from acetone gave an analytical sample, M.P. 110–111° C.

Analysis.—Calc'd for $C_{19}H_{20}ClNO_2S$: C, 63.05%; H, 5.57%; N, 3.87%. Found: C, 63.30%; H, 5.74%; N, 3.60%.

1-(β-p-chlorothiophenoxyethyl)-6,7-dimethoxy-1,2,3,4-tetrahydroisoquinoline (III).—To a stirred suspension of 9.0 g. (0.025 mole) 1-β-p-chlorothiophenoxyethyl)-6,7-dimethoxy-3,4-dihydroisoquinoline II in 100 ml. absolute ethanol kept in a water bath maintained at 60–65° C. was added slowly 1 g. of sodium borohydride. Stirring at 60–65° C. was continued for 1½ hours after the addition. After the solution had cooled to room temperature, 6 N hydrochloric acid was added until hydrogen evolution had ceased. Most of the solvent was evaporated under reduced pressure. The residue was neutralized with 10% sodium carbonate, and extracted with ethyl acetate. The ethyl acetate layers were washed with saturated sodium chloride, dried over anhydrous potassium carbonate and concentrated to dryness to give a crude oil which crystallized spontaneously. Yield, less than 50%. The crude material was recrystallized from methanol to yield an analytical sample, M.P. 79–80° C.

Analysis.—Calc'd for $C_{19}H_{22}ClNO_2S$: C, 62.71%; H, 6.09%; N, 3.85%. Found: C, 62.96%; H, 6.20%; N, 3.64%.

1-(β-p-chlorothiophenoxyethyl)-6,7-dimethoxy-1,2,3,4-tetrahydroisoquinoline (III) (alternate procedure using LiAlH₄).—To a stirred suspension of 0.33 g. (0.009 mole) lithium aluminum hydride in 50 ml. of tetrahydrofuran was added over a period of one-half hour 10 g. (0.028 mole) of 1-(β-p-chlorothiophenoxyethyl)-6,7-dimethoxy-3,4-dihydroisoquinoline II dissolved in 75 ml. of tetrahydrofuran. The suspension was stirred for 3½ hours at room temperature. Ten ml. of saturated sodium sulfate was cautiously added to decompose any excess hydride; the suspension was stirred until completely white.

---
[1] F. Krollpfeiffer, H. Schultze, E. Schlumbolim and E. Sommermeyer, Ber., 58, 1654 (1925).

Solid sodium sulfate was added and the solids were removed by filtration. The solution was concentrated to dryness to give 10 g. of crude crystalline material. One recrystallization from isopropanol gave 7.2 g. of product, M.P. 81–82° C. Its infrared spectrum was identical to the sodium borohydride product.

1 - (β - p - chlorothiophenoxyethyl) - 6,7 - dimethoxy-2 - methyl - 1,2,3,4 - tetrahydroisoquinoline hydrochloride (IV).—A solution of 25 ml. 88% formic acid, 7 ml. 40% formaldehyde, and 8.5 g. (0.023 mole) of 1-(β-p-chlorothiophenoxyethyl) - 6,7 - dimethoxy - 1,2,3,4 - tetrahydroisoquinoline III was heated on a steam bath for two hours. Six ml. concentrated hydrochloric acid was added and the solution was concentrated to dryness to give the crude product which was recrystallized from methanol to give 9.2 g. analytically pure material, M.P. 197–199° C. (decomp.).

Analysis.—Calc'd for $C_{20}H_{24}ClNO_2S \cdot HCl$: C, 57.96%; H, 6.22%; N, 3.38%. Found: C, 57.88%; H, 6.29%; N, 3.08%.

Example 2

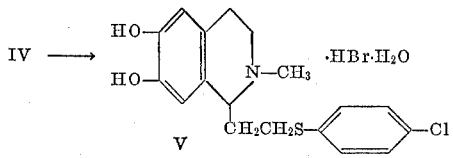

1 - (β - p - chlorothiophenoxyethyl) - 6,7 - dimethoxy-2 - methyl - 1,2,3,4 - tetrahydroisoquinoline hydrobromide hydrate (V).—A mixture of pyridine hydrochloride (20 g. damp weight fused at 190° C. under dry $N_2$ prior to use) and 3.5 g. (0.0084 mole) of 1-(β-p-chlorothiophenoxyethyl) - 6,7 - dimethoxy - 2 - methyl - 1,2,3,4 - tetrahydroisoquinoline hydrochloride IV was heated together in an oil bath maintained at 200–220° C. for 25 minutes. The cooled residue was treated with 50 ml. water and 5 g. sodium bromide. The crystals were collected and washed with water to give 3.5 g. crude dark material. Several crystallizations from methanol-water containing some hydrobromic acid and a Norit treatment gave a colorless analytical sample, M.P. 100.0–104.0° C.

Analysis.—Calc'd for $C_{18}H_{20}ClNO_2S \cdot HBr \cdot H_2O$: C, 48.17; H, 5.16; N, 3.12; $H_2O$, 4.02. Found: C, 48.25; H, 5.12; N, 2.92; $H_2O_{KF}$, 4.38.

Example 3

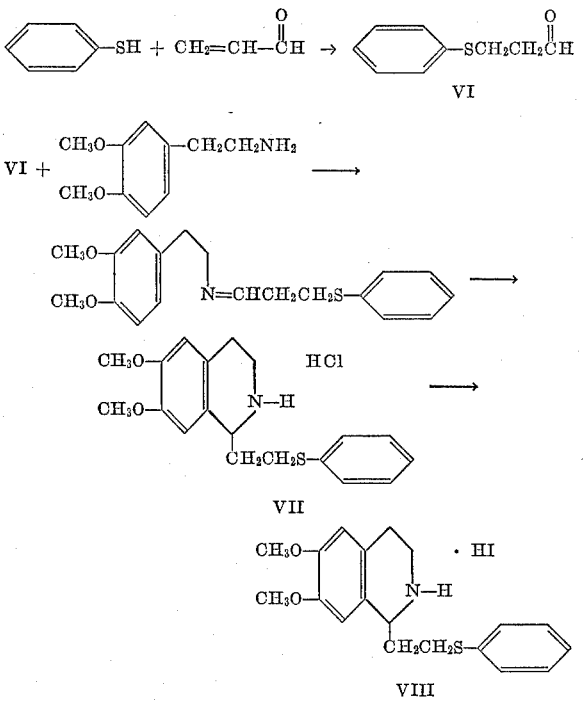

VIII

β-Thiophenoxypropionaldehyde (VI).[2]—Acrolein (7 ml., 0.1 mole) containing 0.1 g. cupric acetate hydrate cooled to −3° C. was treated slowly over a period of 45 minutes with 11.0 g. thiophenol (0.1 mole) maintaining the temperature below 0° C. Stirring was continued at 0° C. for one hour. The mixture was diluted with 10 ml. toluene, dried over sodium sulfate and filtered. Removal of the toluene at reduced pressure and distillation of the residue yielded 9 g. (54%) colorless oil, B.P. 0.7 mm./Hg 94–99° C. The infrared shows strong absorption at 5.81μ attributable to the aldehyde carbonyl and two weaker sharp bands at 3.56μ and 3.69μ attributable to the aldehyde carbon-hydrogen stretching vibration.

6,7-dimethoxy-1 - (β-thiophenoxyethyl - 1,2,3,4 - tetrahydroisoquinoline hydrochloride (VII).—β-Thiophenoxypropionaldehyde VI (9.0 g., 0.054 mole) and 11.0 g. homoveratrylamine (0.061 mole) were placed together in isopropanol and warmed on a steam bath. The isopropanol was removed under reduced pressure to leave a pale yellow oil. The infrared spectrum of this oil shows complete disappearance of the absorption at 5.81μ in the aldehyde and appearance of a new band at 6.00μ of only medium intensity.

The above oil was treated with 75 ml. 24% hydrochloric acid and heated on a steam bath for 1½ hours. The dark reaction mixture was diluted with isopropanol, treated with Norit, filtered and washed through with methanol and concentrated to dryness under reduced pressure. The residue was taken up in hot 95% ethanol and then cooled in ice. The crystals were collected and washed thoroughly with cold 95% ethanol and dried to give 4.6 g. (23%) of colorless material. Recrystallization from ethanol, water and acetone combination gave an analytical sample, M.P. 214–216° C.

Analysis.—calc'd for $C_{19}H_{23}NO_2S \cdot HCl$: C, 62.36; H, 6.61; N, 3.83. Found: C, 62.50; H, 6.79; N, 4.07.

6,7-dimethoxy - 2 - methyl - 1 - (β - thiophenoxyethyl) - 1,2,3,4-tetrahydroisoquinoline hydroiodide (VIII).—6,7-dimethoxy-1-(β-thiophenoxyethyl)-1,2,3,4 - tetrahydroisoquinoline hydrochloride VII (3.0 g., 0.0082 mole) was treated with dilute sodium carbonate and extracted twice with ethyl acetate. These extracts were dried over potassium carbonate and concentrated to dryness to give the free base as an oil (100% yield). This oil was treated with 10 ml. 88% formic acid and 3 ml. 40% formaldehyde and heated on a steam bath for 2½ hours. The reaction was concentrated to dryness. The residue was taken up in water-methanol and treated with 3 g. potassium iodide. The crystals were collected and recrystallized from 95% ethanol to give 1.6 g. (42%) of analytical material, M.P. 144.0–144.5° C.

Analysis.—Calc'd for $C_{20}H_{25}NO_2S \cdot HI$: C, 50.95; H, 5.56; N, 2.97. Found: C, 51.30, 51.18; H, 5.72, 5.64; N, 2.97.

This compound is a potent muscle-relaxing agent.

Example 4

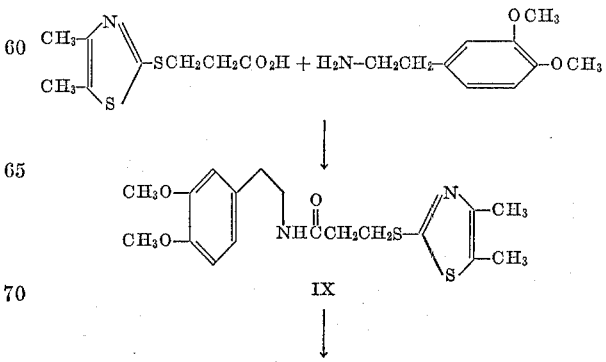

---

[2] Ksenija Sirotanovic, Milka Bajlon-Rocen and Dragica Galovie, Glasinic Hem. Drustva, Beograd 25/26 (8,9,10), 509–18 (1960–61) from C.A., 59, 8635e (1963).

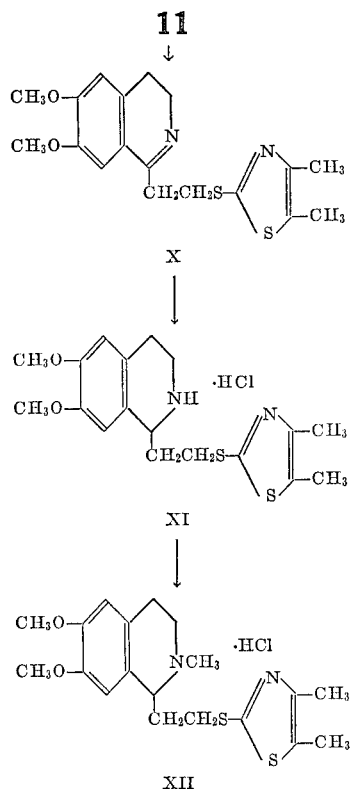

β-(4,5 - dimethyl - 2 - thiazolyl)mercaptopropionic acid homoveratrylamide (IX).—A solution of β-(4,5-dimethyl-2-thiazolyl)mercaptopropionic acid [3] (102 g.; 0.47 mole) and homoveratrylamine (85 g.; 0.47 mole) in one liter of toluene was heated under reflux with a Dean-Stark trap for 96 hours. Seventy-seven percent of the theoretical amount of water was obtained. The reaction mixture was cooled and concentrated to give an oil which was induced to crystallize from acetone-water. The product was collected and dried to give 46 g. (26%) β-(4,5-dimethyl-2-thiazolyl)mercaptopropionic homoveratrylamide. Recrystallization from acetone-water gave an analytical sample, M.P. 113.5–115° C.

Analysis.—Calc'd for $C_{18}H_{24}N_2O_3S_2$: C, 56.83; H, 6.36; N, 7.37. Found: C, 57.32; H, 6.55; N, 7.25.

6,7-dimethoxy - 1 - β - (4,5-dimethyl-2-thiazolyl)mercaptoethyl-3,4-dihydroisoquinoline (X).—To a solution of β-(4,5-dimethyl-2-thiazolyl)mercaptopropionic homoveratrylamide IX (10 g.; $2.6 \times 10^{-2}$ moles) in 50 ml. chloroform was added phosphorus pentachloride (6.7 g.; $3.2 \times 10^{-2}$ moles) gradually with stirring. The orange solution was refluxed 1½ hours, cooled and concentrated to give an oil to which was added 30 ml. water and sufficient saturated sodium carbonate solution to bring the pH to 9. The basic mixture was extracted with two 50 ml. portions of chloroform. The chloroform was dried over magnesium sulfate, filtered and concentrated to give an oil which was induced to crystallize by trituration in "Skellysolve B." The crystals were collected to give 6 g. (67%) product which was recrystallized from methanol-ethyl acetate to give an analytical sample, M.P. 145–148° C. (decomp.).

Analysis.—Calc'd for $C_{18}H_{22}N_2O_2S_2$: C, 59.66; H, 6.12; N, 7.73. Found: C, 59.37; H, 6.12; N, 7.96.

6,7-dimethoxy - 1 - β - (4,5-dimethyl-2-thiazolyl)mercaptoethyl-1,2,3,4 - tetrahydroisoquinoline hydrochloride (XI).—Sodium borohydride (0.42 g.; $1.1 \times 10^{-2}$ moles) was added gradually to a suspension of 6,7-dimethoxy-1-β-(4,5-dimethyl-2-thiazolyl)mercaptoethyl - 1,2-dihydroisoquinoline X (4 g.; $1.1 \times 10^{-2}$ moles) in 50 ml. absolute ethanol warmed in a water bath at 70° C. A vigorous reaction and solution occurred. The mixture was warmed at 60° C. one-half hour and then cooled. A little 6 N hydrochloric acid was added to decompose excess borohydride and the mixture was concentrated. The residue was partitioned between 50 ml. chloroform and 50 ml. water. The chloroform was separated and dried over magnesium sulfate, filtered and concentrated to give a foam which gave 2.2 g. (50%) crystalline hydrochloride from ethanol-hydrochloric acid. Recrystallization from acetone-water gave an analytic sample, M.P. >220° C.

Analysis.—Calc'd for $C_{18}H_{24}N_2O_2S_2 \cdot HCl$: C, 53.91; H, 6.28; N, 6.99. Found: C, 54.25; H, 6.29; N, 6.75.

6,7-dimethoxy-1-β-(4,5 - dimethyl - 2 - thiazolyl)mercaptoethyl-2-methyl-1,2,3,4-tetrahydroisoquinoline hydrochloride (XII).—To a mixture of 6,7-dimethoxy-1-β-(3,4-dimethyl-2-thiazolyl)mercaptoethyl - 1,2,3,4-tetrahydroisoquinoline XI (8 g.; $2.2 \times 10^{-2}$ moles) and formaldehyde ($2.4 \times 10^{-2}$ moles; 1.8 ml. 40%), was added 88% formic acid ($11 \times 10^{-2}$ moles; 4.1 ml.). Vigorous carbon dioxide evolution was noted. The mixture was warmed on the steam bath 1½ hours and concentrated. Addition of one equivalent of hydrochloric acid and further concentration gave a crystalline hydrochloride (5.2 g.; 57%). Recrystallization from acetone-water twice gave an analytical sample, M.P. 180–184° C. (decomp.).

Analysis.—Calc'd for $C_{19}H_{26}N_2O_2S_2 \cdot HCl$: C, 54.98; H, 6.56; N, 6.75. Found: C, 55.05; H, 6.62; N, 6.81.

Example 5

Replacement of the β-p-chlorothiophenoxypropionic acid (also called β-p-chlorophenylmercaptopropionic acid) of Example 1 with an equimolar weight of β-(p-nitrophenylmercapto)propionic acid,
β-(o-trifluoromethylphenylmercapto)propionic acid,
β-(m,p-dichlorophenylmercapto)propionic acid,
β-(o-fluorophenylmercapto)propionic acid,
β-(o-bromophenylmercapto)propionic acid,
β-(o-chlorophenylmercapto)propionic acid,
β-(o,o-dichlorophenylmercapto)propionic acid,
β-(p-methylphenylmercapto)propionic acid,
β-(p-isopropylphenylmercapto)propionic acid,
β-(p-methoxyphenylmercapto)propionic acid,
β-(m,p-dimethoxyphenylmercapto)propionic acid,
β-(o-nitrophenylmercapto)propionic acid,
β-(2-pyridylmercapto)propionic acid,
β-(4-pyridylmercapto)propionic acid,
β-(2-thienylmercapto)propionic acid,
β-(3-thienylmercapto)propionic acid,
β-(2-chlorothienyl-3-mercapto)propionic acid, and
β-(3-chlorothienyl-2-mercapto)propionic acid, respectively, produces 1-[β-(p-nitrophenylmercapto)ethyl]-6,7-dimethoxy-2-methyl-1,2,3,4-tetrahydroisoquinoline hydrochloride,
1-[β-(o-trifluoromethylphenylmercapto)ethyl]-6,7-dimethoxy-2-methyl-1,2,3,4-tetrahydroisoquinoline hydrochloride,
1-[β-(m,p-dichlorophenylmercapto)ethyl]6,7-dimethoxy-2-methyl-1,2,3,4-tetrahydroisoquinoline hydrochloride,
1-[β-(o-fluorophenylmercapto)ethyl]-6,7-dimethoxy-2-methyl-1,2,3,4-tetrahydroisoquinoline hydrochloride,
1-[β-(o-bromophenylmercapto)ethyl]-6,7-dimethoxy-2-methyl-1,2,3,4-tetrahydroisoquinoline hydrochloride,
1-[β-(o-chlorophenylmercapto)ethyl]-6,7-dimethoxy-2-methyl-1,2,3,4-tetrahydroisoquinoline hydrochloride,
1-[β-(o,o-dichlorophenylmercapto)ethyl]-6,7-dimethoxy-2-methyl-1,2,3,4-tetrahydroisoquinoline hydrochloride,
1-[β-(p-methylphenylmercapto)ethyl]-6,7-dimethoxy-2-methyl-1,2,3,4-tetrahydroisoquinoline hydrochloride,
1[β-(p-isopropylphenylmercapto)ethyl]-6,7-dimethoxy-2-methyl-1,2,3,4-tetrahydroisoquinoline hydrochloride,
1-[β-(p-methoxyphenylmercapto)ethyl]-6,7-dimethoxy-2-methyl-1,2,3,4-tetrahydroisoquinoline hydrochloride,
1-[β-(m,p-dimethoxyphenylmercapto)ethyl]-6,7-dimethoxy-2-methyl-1,2,3,4-tetrahydroisoquinoline hydrochloride,

---

[3] Stewart and Mathes, J. Org. Chem. 14, 1111 (1949).

1-[β-(o-nitrophenylmercapto)ethyl]-6,7-dimethoxy-
2-methyl-1,2,3,4-tetrahydroisoquinoline hydrochloride,
1-[β-(2-pyridylmercapto)ethyl]-6,7-dimethoxy-2-methyl-
1,2,3,4-tetrahydroisoquinoline hydrochloride,
1-[β-(4-pyridylmercapto)ethyl]-6,7-dimethoxy-2-methyl-
1,2,3,4-tetrahydroisoquinoline hydrochloride,
1,[β-(2-thienylmercapto)ethyl]6,7-dimethoxy-2-methyl-
1,2,3,4-tetrahydroisoquinoline hydrochloride,
1-[β-(3-thienylmercapto)ethyl]-6,7-dimethoxy-2-methyl-
1,2,3,4-tetrahydroisoquinoline hydrochloride,
1-[β-(2-chlorothienyl-3-mercapto)ethyl]-6,7-dimethoxy-
2-methyl-1,2,3,4-tetrahydroisoquinoline hydrochloride,
and
1-[β-(3-chlorothienyl-2-mercapto)ethyl]-6,7-dimethoxy-
2-methyl-1,2,3,4-tetrahydroisoquinoline hydrochloride,
respectively.

Example 6

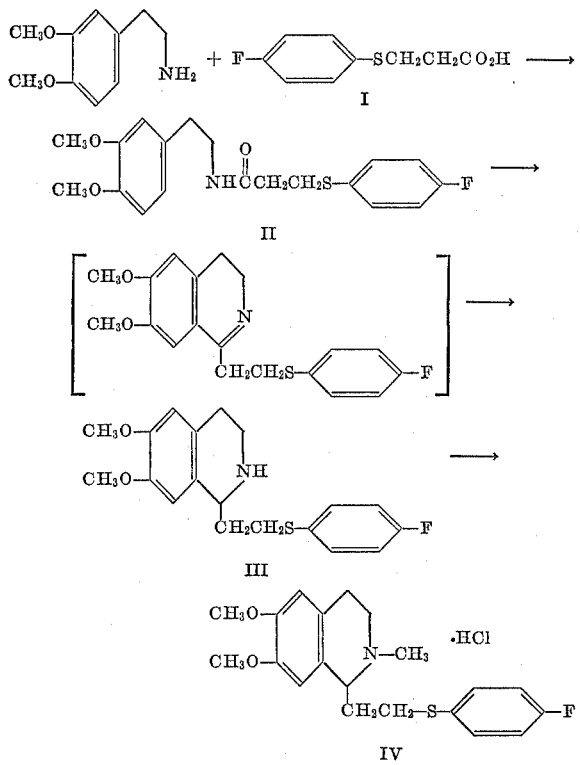

β(p-fluorothiophenoxy)propionic acid (I).—p-fluorothiophenol (20 g., 0.156 mole) was dissolved in 50 ml. of water containing 12.5 g. (0.312 mole) of sodium hydroxide. β-bromopropionic acid (23.8 g., 0.156 mole) was added and the resultant solution was warmed on the steam bath one half hour. The mixture was cooled and acidified with 15 ml. concentrated hydrochloric acid upon which the product oiled out. The oil was induced to crystallize by scratching and was collected and dried to give 31 g. (100%) β(p-fluorothiophenoxy) propionic acid. Recrystallization from ethyl acetate gas an analytical sample, M.P. 70–72° C.

Analysis.—Calc'd for $C_9H_9FO_2S$: C, 53.98; H, 4.53. Found: C, 54.00; H, 4.43.

β(p-fluorothiophenoxy)propionic acid homoveratrylamide (II).—β(p-fluorothiophenoxy)propionic acid (27 g., 0.130 mole) and homoveratrylamine (24.4 g., 0.135 mole) were mixed in 125 ml. of toluene and the solution was refluxed for 42 hours with a Dean-Stark trap until the theoretical amount of water (2.4 ml.) had been collected. The solution was filtered and concentrated. The resultant oil was induced to crystallize by scratching in acetone-water. The product was collected and dried to give 29 g. (61%) of β(p-fluorothiophenoxy)propionic acid homoveratrylamide. Recrystallization from ethyl acetate-"Skellysolve B" gave an analytical sample, M.P. 76° C.

Analysis.—Calc'd for $C_{19}H_{22}FNO_3S$: C, 62.79; H, 6.10; N, 3.85. Found: C, 62.65; H, 6.06; N, 3.76.

6,7 - dimethoxy - 1 - (β-p-fluorothiophenoxyethyl)-1,2,3,4-tetrahydroisoquinoline (III).—Phosphorous pentachloride (4.5 g., 0.025 mole) was slowly added to a solution of β(p - fluorothiophenoxy)propionic acid homoveratrylamide (5 g., 0.0138 mole) in 50 ml. chloroform. The mixture was refluxed one hour and twenty minutes and concentrated to a red oil. The oil was suspended in 25 ml. water and basified to pH 9 with sodium carbonate solution (20%). The basic suspension was extracted with two 40 ml. portions of ethyl acetate. The ethyl acetate was dried over magnesium sulfate, filtered and concentrated to a red oil (5 g.) which crystallized but defied recrystallization.

The crude dihydroisoquinoline was suspended in 50 ml. ethanol warmed in a water bath at 60° C. Sodium borohydride (1.9 g. 0.05 mole) was added gradually with stirring. The resultant solution was stirred 45 minutes at 65° and then cooled. Addition of one drop of hydrochloric acid gave no hydrogen evolution indicating all sodium borohydride had been consumed. The mixture was concentrated and the residue was treated with water and extracted with two portions of ethyl acetate. The ethyl acetate was dried over magnesium sulfate, filtered and concentrated to give a yellow oil which soon crystallized. The product was isolated by trituration in ethyl acetate-"Skellysolve B" and subsequent collection by filtration to give 1.3 g. 6,7 - dimethoxy-1-(β-p-fluorothiophenoxyethyl) - 1,2,3,4 - tetrahydroisoquinoline. Recrystallization from ethyl acetate-"Skellysolve B" gave an analytical sample, M.P. 95.5–97.5° C.

Analysis.—Calc'd for $C_{19}H_{22}FNO_2S$: C, 65.68; H, 6.38; N, 4.03. Found: C, 65.80; H, 6.38; N, 4.02.

6,7 - dimethoxy - 1 - (β-p-fluorothiophenoxyethyl)-2-methyl - 1,2,3,4 - tetrahydroisoquinoline hydrochloride (IV).—Formic acid (0.9 ml. 88% aqueous, 0.017 mole) was added to a mixture of 6,7 - dimethoxy - 1 - (β-p-fluorothiophenoxyethyl) - 1,2,3,4 - tetrahydroisoquinoline (1.7 g., 0.0049 mole) and formaldehyde (0.4 ml. 40% aqueous, >0.005 mole). The mixture was warmed on the steam bath for two and one half hours and concentrated. The residual oil was diluted with one equivalent of concentrated hydrochloric acid, cooled and scratched to give a crystalline solid. This was isolated by trituration in acetone-ethyl acetate and subsequent collection by filtration gave 1.7 g. 6,7 - dimethoxy - 1 -(β-p-fluorothiophenoxyethyl) - 2-methyl - 1,2,3,4-tetrahydroisoquinoline hydrochloride. Recrystallization first from ethanol-methanol and then from acetonitrile gave an analytical sample with two melting points. The first occurs at approx. 130° C. after which solidification occurs followed by a second melting point at approximately 160° C. The melting points art not well defined.

Analysis.—Calc'd for $C_{20}H_{24}FNO_2S \cdot HCl$: C, 60.36; H, 6.33; N, 3.52. Found: C, 60.18; H, 6.58; N, 3.87.

Example 7

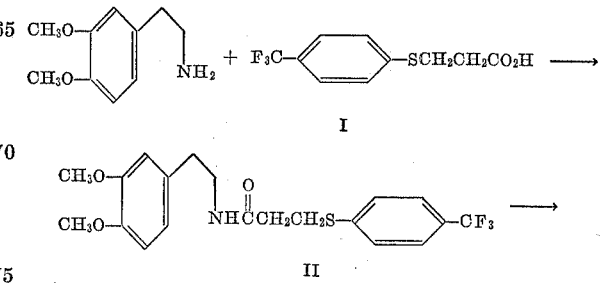

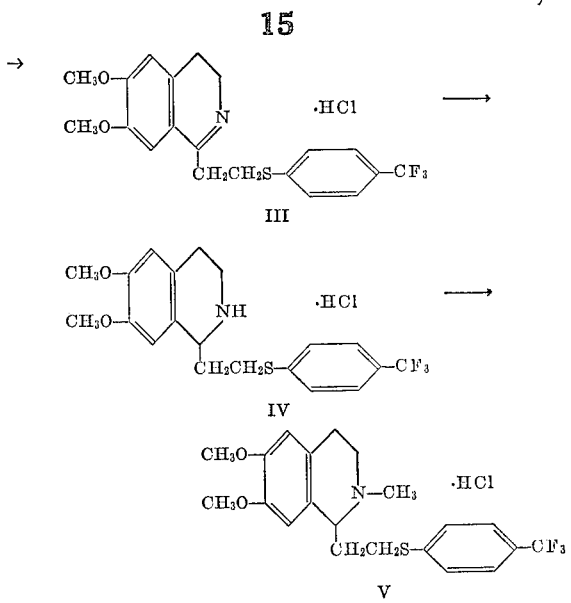

β(p-Trifluoromethylthiophenoxy)propionic acid (I).—β-Bromopropionic acid (24.4 g., 0.159 mole) was added to a mixture of p-trifluoromethylthiophenol [4] (30 g., 0.159 mole) in 50 ml. 25.6% sodium hydroxide solution. The resultant solution was warmed for one-half hour on the steam bath, cooled and acidified with 32 ml. concentrated hydrochloric acid. The product crystallized and was collected by filtration to give 40 g. (89%) β(p-trifluoromethylthiophenoxy)propionic acid. Recrystallization from "Skellysolve B" gave an analytical sample, M.P. 63–64° C.

Analysis.—Calc'd for $C_{10}H_9F_3O_2S$: C, 47.99; H, 3.63. Found: C, 48.16; H, 3.82.

β(p-trifluoromethylthiophenoxy)propionic acid homoveratrylamide (II).—To a solution of β(p-trifluoromethylthiophenoxy)propionic acid (32 g., 0.128 mole) in 150 ml. toluene was added homoveratrylamine (21.8 g., 0.12 mole). The mixture was refluxed 24 hours with a Dean-Stark trap to give the theoretical amount of water. Cooling the solution gave 27 g. crystalline β(p-trifluoromethylthiophenoxy)propionic acid homoveratrylamide (54%). Concentration of the mother liquid yielded a second crop. Recrystallization from ethyl acetate-"Skellysolve B" gave an analytical sample, M.P. 81–83° C.

Analysis.—Calc'd for $C_{20}H_{22}F_3NO_3S$: C, 58.09; H, 5.36; N, 3.39. Found: C, 57.90; H, 5.53; N, 3.32.

6,7-dimethoxy 1-(β - p - trifluoromethylthiophenoxyethyl) - 3,4 - dihydroisoquinoline hydrochloride (III).—The homoveratrylamide of β(p-trifluorothiophenoxy)propionic acid (5 g., 0.012 mole) was suspended in 50 ml. toluene and phosphorous oxychloride (9.2 g., 0.06 mole) was added. The mixture was refluxed three hours and fifteen minutes, cooled and concentrated to give an oil which was suspended in 50 ml. water and warmed below reflux temperature 16 hours. The mixture was cooled and extracted with two 50 ml. portions of chloroform. The chloroform extracts were dried over magnesium sulfate, filtered and concentrated to give 3 g. white crystalline 6,7 - dimethoxy-1-(β-p-trifluoromethylthiophenoxyethyl)-3,4-dihydroisoquinoline hydrochloride. Recrystallization from acetone-ethanol gave an analytical sample, M.P. 152.5–154° C.

Analysis.—Calc'd for $C_{20}H_{20}F_3NO_2S \cdot HCl$: C, 55.61; H, 4.90; N, 3.24. Found: C, 55.62; H, 4.93; N, 2.95.

6,7 - dimethoxy - 1 - (β-p-trifluoromethylthiophenoxyethyl) - 1,2,3,4 - tetrahydroisoquinoline hydrochloride (IV).—6,7 - dimethoxy-1-(β - p - trifluoromethylthiophenoxyethyl)-3,4-dihydroisoquinoline (7 g., 0.0177 mole) obtained from the hydrochloride by neutralization with sodium carbonate was slurried in 100 ml. ethanol and warmed to 55° C. with a water bath. Sodium borohydride (0.75 g., 0.02 mole) was added gradually with stirring and the mixture was warmed 45 minutes at 60° C. Hydrochloric acid was added until all excess hydride was decomposed and the mixture was concentrated. The residue was treated with water and extracted with chloroform. The chloroform was dried over magnesium sulfate, filtered and concentrated to give an oil which gave 4.6 g. crystalline hydrochloride from ethyl acetate-ether. Recrystallization from ethyl acetate gave an analytical sample, M.P. 110–165° C. of 6,7-dimethoxy-1-(β-p-trifluoromethylthiophenoxyethyl) - 1,2,3,4 - tetrahydroisoquinoline hydrochloride.

Analysis.—Calc'd for $C_{20}H_{22}F_3NO_2S \cdot HCl$: C, 54.09; H, 5.34; N, 3.23. Found: C, 54.18; H, 5.64; N, 3.15.

6,7 - dimethoxy - 1 - (β-p-trifluoromethylthiophenoxyethyl)-2-methyl - 1,2,3,4 - tetrahydroisoquinoline hydrochloride (V).—Formaldehyde (0.093 mole, 0.7 ml. 40% aqueous) was added to a mixture of 6,7-dimethoxy-1-(β-p-trifluoromethylthiophenoxyethyl) - 1,2,3,4 - tetrahydroisoquinoline hydrochloride (3.6 g., 0.0083 mole) in formic acid (1.5 ml. 88% aqueous, 0.029 mole) and one equivalent of sodium hydroxide. Vigorous carbon dioxide evolution was noted. The reaction was warmed one and one half hours on the steam bath and diluted with two equivalents of hydrochloric acid. Addition of water gave three g. crystalline hydrochloride of 6,7-dimethoxy-1-(β-p-trifluoro-methylthiophenoxyethyl) - 2 - methyl-1,2,3,4-tetrahydroisoquinoline. Recrystallization from methanol gave an analytical sample, M.P. 198–212° C. (decomp.).

Analysis.—Calc'd for $C_{21}H_{24}F_3NO_2S \cdot HCl$: C, 56.30; H, 5.63; N, 3.12. Found: C, 56.13; H, 5.63; N, 2.97.

Example 8

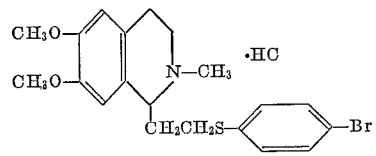

1 - (β - p - bromothiophenoxyethyl)-6,7-dimethoxy-2-methyl - 1,2,3,4 - tetrahydroisoquinoline hydrochloride.—A solution of 0.3 g. (0.0074 mole) sodium hydroxide and 1.4 g. (0.0074 mole) of p-bromothiophenol in 30 ml. ethanol was mixed with 3.5 g. (0.0074 mole) [2,1-a]azetidino - 6,7 - dimethoxy - 2 - methyl-1,2,3,4-tetrahydroisoquinolinium p-bromobenzenesulfonate and heated one and one-half hours on a steam bath. The mixture was concentrated to dryness at reduced pressure. The residue was treated with water and extracted with chloroform. The chloroform extracts were dried over magnesium sulfate, filtered and concentrated to dryness to leave an oil which yielded 2.6 g. (76%) of crystalline product from acetone-dry hydrogen chloride. Recrystallization from methanol gave analytically pure 1-(β-p-bromothiophenoxyethyl)-6,7-dimethoxy-2-methyl-1,2,3,4-tetrahydroisoquinoline hydrochloride, M.P. 192–>200° C. (not well defined).

Analysis.—Calc'd for $C_{20}H_{24}BrNO_2S \cdot HCl$: C, 52.35; H, 5.49; N, 3.05. Found: C, 52.56; H, 5.69; N, 3.04.

By similar procedures the compounds of the following Examples 9 through 12 were prepared in the indicated amounts and with the properties stated.

Example 9

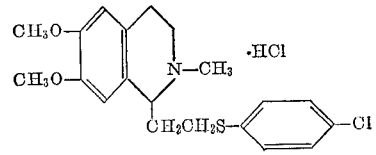

---

[4] Reported in F. Gadient et al., Helv. Chim. Acta, 45, 1860–1870 (1962). Cf. C.A., 58, 4575a (1963). Preparative procedure that of Org. Syn. Coll. vol. I, John Wiley & Sons, Inc., New York, N.Y., p. 504 (1941).

1 - (β - p - chlorothiophenoxyethyl) - 6,7-dimethoxy-2-methyl-1,2,3,4-tetrahydroisoquinoline hydrochloride (for comparison with the same compound prepared previously by another method): 80.5 mg. (0.002 mole) sodium hydroxide, 310 mg. (0.002 mole) p-chlorothiophenol, 1 g. (0.0021 mole) [2,1-a]azetidino-6,7-dimethoxy-2-methyl-1,2,3,4 - tetrahydroisoquinolinium p-bromobenzenesulfonate yielded 580 mg. 1-(β-p-chlorothiophenoxyethyl)-6,7-dimethoxy-2-methyl-1,2,3,4-tetrahydroisoquinoline hydrochloride (67%) with IR identical to IR of the same compound prepared by the method of Example 1.

Example 10

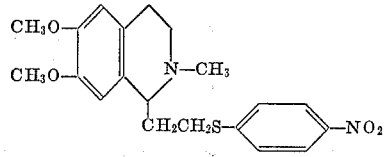

6,7 - dimethoxy - 2 - methyl - 1-(β-p-nitrothiophenoxyethyl)-1,2,3,4-tetrahydroisoquinoline: 0.212 g. (0.0053 mole) sodium hydroxide, 0.82 g. (0.0053 mole) p-nitrothiophenol, 2.0 g. (0.0042 mole) [2,1-a]azetidino-6,7-dimethoxy - 2 - methyl-1,2,3,4-tetrahydroisoquinolinium p-bromobenzenesulfonate yielded 1.0 g. (61%) 6,7-dimethoxy - 2 - methyl - 1 - (β-p-nitrothiophenoxyethyl)-1,2,3,4-tetrahydroisoquinoline from ethyl acetate, M.P. 129–131° C.

Analysis.—Calc'd for $C_{20}H_{24}N_2O_4S$: C, 61.83; H, 6.23; N, 7.21. Found: C, 61.50; H, 6.29; N, 7.50.

Example 11

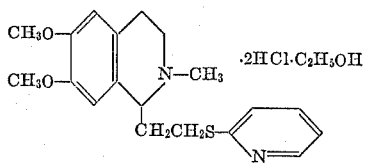

(A) 6,7 - dimethoxy - 2-methyl-1-(β-2-pyridyl-N-oxide mercaptoethyl) - 1,2,3,4-tetrahydroisoquinoline dihydrochloride monoethanolate: 0.94 g. (0.0063 mole) 2-mercaptopyridine-N-oxide sodium salt, 2.5 g. (0.0053 mole) [2,1 - a]azetidino - 6,7-dimethoxy-2-methyl-1,2,3,4-tetrahydroisoquinolinium p - bromobenzenesulfonate yielded 1.8 g. (71%) 6,7-dimethoxy-2-methyl-1-(β-2-pyridyl-N-oxide mercaptoethyl)-1,2,3,4-tetrahydroisoquinoline dihydrochloride monoethanolate from acetone-hydrogen chloride. Recrystallization from ethanol-hydrogen chloride gave an analytical sample, M.P. 110–135° C. (decomp.).

Analysis.—Calc'd for $C_{19}H_{24}N_2O_3S \cdot 2HCl \cdot C_2H_5OH$: C, 52.60; H, 6.73; N, 5.85. Found: C, 52.94; H, 6.93; N, 5.86.

(B) 6,7 - dimethoxy - 2-methyl-1-(β-2-pyridyl mercaptoethyl) - 1,2,3,4-tetrahydroisoquinoline dihydrochloride monoethanolate.—A cooled stirred solution of 4 g. (0.011 mole) 6,7 - dimethoxy - 2-methyl-1-(β-2-pyridyl-N-oxide mercaptoethyl)-1,2,3,4-tetrahydroisoquinoline in 30 ml. chloroform was treated with 2.2 ml. phosphorous trichloride. The solution was heated under reflux for one and one-half hours. The chloroform solution was neutralized and washed with dilute sodium carbonate, dried over magnesium sulfate, filtered and concentrated to dryness to leave an oil which yielded 2 g. (40%) crystalline 6,7-dimethoxy - 2 - methyl - 1 - (β-2-pyridyl mercaptoethyl)-1,2,3,4-tetrahydroisoquinoline dihydrochloride monoethanolate from ethanolic hydrogen chloride. Recrystallization from ethanolic hydrogen chloride gave an analytical sample, M.P. 118–135° C. decomp.

Analysis.—Calc'd for $C_{19}H_{24}N_2O_2S \cdot 2HCl \cdot C_2H_5OH$: C, 54.42; H, 6.96; N, 6.05. Found: C, 54.50; H, 7.00; N, 5.95.

Example 12

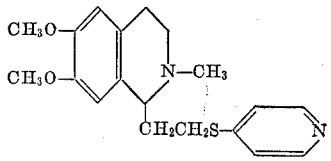

(A) 6,7 - dimethoxy - 2-methyl-1-(β-4-pyridyl-N-oxide mercaptoethyl) - 1,2,3,4-tetrahydroisoquinoline.—0.0098 mole of 4-mercaptopyridine-N-oxide sodium salt [prepared in crude form by hydrolysis of 2 g. (0.0098 mole) 4-pyridine-N-oxide thiouronium chloride in sodium hydroxide]. 2.5 g. (0.0053 mole) [2,1-a]azetidino-6,7-dimethoxy - 2 - methyl-1,2,3,4-tetrahydroisoquinolinium p-bromobenzenesulfonate yielded 1.6 g. (85%) 6,7-dimethoxy - 2 - methyl-1-(β-4-pyridyl-N-oxide mercaptoethyl)-1,2,3,4-tetrahydroisoquinoline. An analytical sample was recrystallized from methanol-ethyl acetate, M.P. 156.5–157.5° C.

Analysis.—Calc'd for $C_{19}H_{24}N_2O_3S$: C, 63.30; H, 6.71; N, 7.77. Found: C, 63.20; H, 6.88; N, 7.84.

(B) 6,7 - dimethoxy - 2-methyl-1-(β-4-pyridylmercaptoethyl) - 1,2,3,4 - tetrahydroisoquinoline.—By a similar procedure to Example 11, 3.1 g. (0.0086 mole) 6,7-dimethoxy - 2-methyl-1-(β-4-pyridyl-N-oxide mercaptoethyl)-1,2,3,4-tetrahydroisoquinoline was allowed to react with 2 ml. phosphorous trichloride to yield 3 g. (100%) 6,7 - dimethoxy - 2-methyl-1-(β-4-pyridylmercaptoethyl)-1,2,3,4 - tetrahydroisoquinoline. Recrystallization from ethyl acetate-"Skellysolve B" gave an analytical sample, M.P. 95–96.5° C.

Analysis.—Calc'd for $C_{19}H_{24}N_2O_2S$: C, 66.24; H, 7.02; N, 8.13. Found: C, 65.74; H, 7.06; N, 8.23.

Example 13

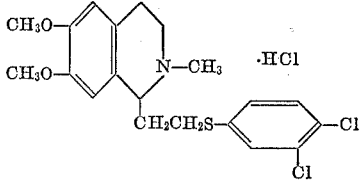

1 - (β-3,4-dichlorothiophenoxyethyl)-6,7-dimethoxy-2-methyl - 1,2,3,4-tetrahydroisoquinoline hydrochloride.—0.212 g. (0.0053 mole) sodium hydroxide, 0.95 g. (0.0053 mole), 3,4-dichlorothiophenol, 2.5 g. (0.0053 mole) [2,1-a]azetidino - 6,7-dimethoxy-2-methyl - 1,2,3,4-tetrahydroisoquinolinium-p-bromobenzenesulfonate yielded 2 g. (92%) 1 - (β-3,4-dichlorothiophenoxyethyl)-6,7-dimethoxy-2-methyl-1,2,3,4-tetrahydroquinoline which gave a crystalline hydrochloride from ethyl acetate. Recrystallization from acetone-ethanol gave an analytical sample, M.P. 160–165° C. (decomp).

Analysis.—Calc'd for $C_{20}H_{23}NO_2SCl_2 \cdot HCl$: C, 53.52; H, 5.39; N, 3.12. Found: C, 53.63; H, 5.58; N, 3.26, 3.21.

This compound was found to be a very active analgetic agent; thus, it exhibited analgetic activity at a dosage as low as 1 mgm./kg. s.c. in the rat-tail flick test.

Example 14

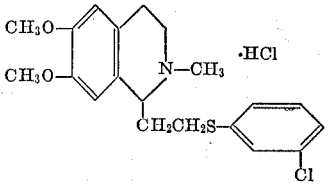

1 - (β-m-chlorothiophenoxyethyl) - 6,7 - dimethoxy - 2-methyl - 1,2,3,4 - tetrahydroisoquinoline hydrochloride.—0.264 g. (0.0066 mole) sodium hydroxide, 0.96 g. (0.0066 mole) m-chlorothiophenol, 3.0 g. (0.0064 mole) [2,1-a]azetidino - 6,7 - dimethoxy - 2 - methyl - 1,2,3,4 - tetrahydroisoquinolinium - p - bromobenzenesulfonate yielded 1 - (β - m - chlorothiophenoxyethyl) - 6,7 - dimethoxy-2-methyl-1,2,3,4-tetrahydroisoquinoline as an oil which gave 1.5 g. (58%) of a crystalline hydrochloride from ethyl acetate-dry hydrogen chloride. Two recrystallizations from ethyl acetate-ethanol gave an analytical sample, M.P. 156–158° C.

Analysis.—Calc'd for $C_{20}H_{24}ClNO_2S \cdot HCl$: C, 57.96; H, 6.22; N, 3.38. Found: C, 57.85; H, 6.19; N, 3.21.

Example 15

6,7 - dimethoxy - 2 - methyl - 1 - (β-p-methylthiophenoxyethyl) - 1,2,3,4 - tetrahydroisoquinoline hydrobromide.—0.212 g. (0.0053 mole) sodium hydroxide, 0.66 g. (0.0053 mole) p-methylthiophenol, 2.5 g. (0.0053 mole) [2,1-a]azetidino - 6,7 - dimethoxy - 2 - methyl - 1,2,3,4-tetrahydroisoquinolinium - p - bromobenzenesulfonate yielded 1.7 g. (89%) 6,7-dimethoxy-2-methyl-1-(β-p-methylthiophenoxyethyl) - 1,2,3,4 - tetrahydroisoquinoline which gave the hydrobromide from isopropanol-water. Recrystallization from acetone-water gave an analytical sample, M.P. 190–194° C.

Analysis.—Calc'd. for $C_{21}H_{27}NO_2S \cdot HBr$: C, 57.53; H, 6.44; N, 3.20. Found: C, 57.29; H, 6.55; N, 3.12.

Example 16

6,7 - dimethoxy - 2 - methyl - 1 - (β-2,4,5 - trichlorothiophenoxyethyl)-1,2,3,4-tetrahydroisoquinoline (procedure previously described).—0.254 g. (0.0064 mole) sodium hydroxide, 1.4 g. (0.0064 mole) 2,4,5-trichlorothiophenol and 3.0 g. (0.0064 mole) [2,1-a]azetidino-6,7-dimethoxy - 2 - methyl - 1,2,3,4 - tetrahydroisoquinolinium-p - bromobenzenesulfonate yielded 6,7 - dimethoxy - 2-methyl - 1 - (β-2,4,5 - trichlorothiophenoxyethyl)-1,2,3,4-tetrahydroisoquinoline as a crystalline solid which was recrystallized from ethyl acetate-"Skellysolve B" to give 1.3 g. (46%) of an analytical sample, M.P. 100–101°.

Analysis.—Calc'd for $C_{20}H_{22}Cl_3NO_2S$: C, 53.76; H, 4.96; N, 3.14. Found: C, 53.91; H, 4.96; N, 3.03.

As set forth in detail below, the compounds of the present invention are very efficiently resolved into their optical isomers by the use of certain novel optically active acids. These optically active acids have the formula wherein $R^1$ is hydrogen, chloro, bromo or nitro and $R^2$ is hydrogen, chloro or bromo but $R^1$ and $R^2$ are not each hydrogen.

The preferred acids have the formulae and

The process of preparing such a substituted tartranilic acid having the formula wherein $R^1$ and $R^2$ have the meaning set out above comprising the consecutive steps of (a) heating a mixture of (+)-2,3-diacetyl-succinic anhydride and a substituted aniline having the formula wherein $R^1$ and $R^2$ have the meaning set out above, to produce the corresponding diacetyl-tartranilic acid, and (b) deacetylating said diacetyl-tartranilic acid by treatment with alkali to produce the desired dextro-rotatory tartranilic acid.

The process of resolving a racemic organic amine of the present invention comprises:

(a) forming a mixture of the two enantiomeric salts of said amine with a dextro-rotatory ring-substituted tartranilic acid, said substituent comprising preferably at least one nitro, chloro or bromo group, (b) separating said enantiomeric salts by fractional crystallization and then (c) converting said separated enantiomeric salts to the respective optical isomers of the organic amine, preferably by treatment with a strong base.

The (+)-2,3-diacetylsuccinic anhydride used as a starting material is prepared according to Organic Syntheses, Collected, vol. IV, p. 242, Wiley (1963) or, preferably, as exemplified below.

The following examples are given to illustrate the resolution of the compounds of the present invention. All temperatures are given in degrees centigrade. The amines used to illustrate the resolution of the compounds of the present invention have the structures and The former is a potent analgesic agent and muscle relaxant. The optical isomers of the latter are converted into optical isomers of both the former and the other amines of the present invention as described in detail below by the following series of reactions:

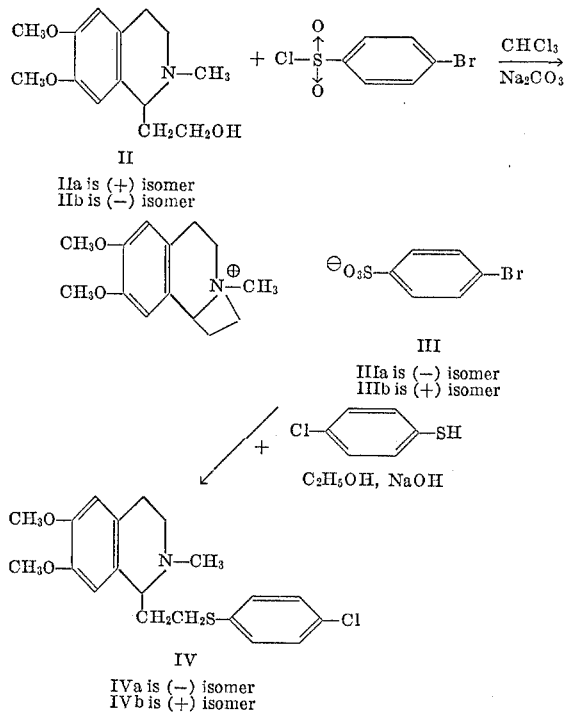

IIa is (+) isomer
IIb is (−) isomer

IIIa is (−) isomer
IIIb is (+) isomer

IVa is (−) isomer
IVb is (+) isomer

PREPARATION OF RESOLVING AGENTS

Example 17

(+) - 2' - Nitrotartranilic acid.—(+) - 2,3 - diacetylsuccinic anhydride (44 g., 0.2 mole) and 2-nitroaniline (35 g., 0.25 mole) were placed with 300 ml. methylene chloride and heated under reflux for 3½ hours. This solution was cooled to room temperature and treated dropwise with stirring with a solution of 39 g. potassium hydroxide (86% pellets; 0.6 mole) in 400 ml. water. This was stirred 1 hour at room temperature. The layers were separated and the methylene chloride layer was extracted with 100 ml. more water. The combined aqueous layers were heated on a steam bath, treated with decolorizing carbon, filtered hot through diatomaceous earth ("Celite"), acidified with 50 ml. conc. hydrochloric acid and cooled at 5° C. overnight. The crystals were collected and washed with 100 ml. cold water to yield 32 g. yellow crystals. This material was taken up in 300 ml. hot water, treated with 15 ml. conc. hydrochloric acid and cooled. Collection of the crystals gave 28 g. (52%) of 2'-nitrotartranilic acid. A sample was recrystallized from n-propanol for analysis, M.P. 196.0–198.0, $[\alpha]_D^{25}$ +71.3° (c. 2.5, ethanol), $[\alpha]_D^{25}$ +89.8° (c. 0.83, $H_2O$).

Analysis.—Calc'd for $C_{10}H_{10}N_2O_7$: C, 44.45; H, 3.73; N, 10.37. Found: C, 44.41; H, 3.79; N, 10.31.

Example 18

(+)-2,4-dichlorotartranilic acid.—(+) - 2,3 - diacetylsuccinic anhydride (22 g.; 0.1 mole) and 2,4-dichloroaniline (18 g.; 0.11 mole) in 150 ml. methylene chloride were stirred together for 2 hours. A solution of 21 g. potassium hydroxide (87° pellets; 0.32 mole) in 200 ml. water was added and the two phase system stirred vigorously for 1 hour. The methylene chloride layer was separated, extracted with 100 ml. water and discarded. The combined aqueous extracts were warmed on a steam bath, filtered, acidified with 35 ml. conc. hydrochloric acid and cooled for crystallization. Collection of this material gave 17 g. (59%) colorless (+)-2',4'-dichlorotartranilic acid. Several crystallizations from water gave an analytical sample, M.P. 182.5–192.5°, $[\alpha]_D^{25}$ +100.7° (c. 1.6, 95% ethanol).

Analysis.—Calc'd for $C_{10}H_9NO_5$: C,40.84; H,3.08; N, 4.76. Found: C, 40.84°; H, 3.21; N, 4.57.

Example 19

(+)-2,3-diacetoxysuccinic anhydride.—A mixture of (+) tartaric acid (150 g.; 1 mole) in 700 ml. acetic anhydride was warmed with stirring until the exothermic reaction started. Heating was discontinued and the reaction was allowed to run its course (about 2–3 hours). The colorless solution was concentrated to dryness at reduced pressure. Final drying under high vacuum gave a quantitative yield of (+)-2,3-diacetoxysuccinic anhydride (216 g.) of good purity. This material may be recrystallized from ethyl acetate—"Skellysolve B" if better purity is desired. Recrystallized material has a melting point of 133.0–133.5° and $[\alpha]_D^{25}$ +60.5° (c. 6.2 acetone).

Substituted tartranilic acids V (a–e).—(+)-2,3-diacetoxysuccinic anhydride (21.6 g.; 0.1 mole) and substituted aniline (0.11 mole) in 200 ml. methylene chloride were heated under reflux for 3 hours. This solution was treated with a solution of potassium hydroxide (21 g. of 86% potassium hydroxide pellets; 0.32 mole) in 200 ml. water and stirred vigorously for 15 minutes. The methylene chloride layer was separated and extracted with 100 ml. water. The combined aqueous layers were stirred for 2 hours, then warmed to solution, treated with decolorizing carbon (if necessary), filtered through diatomaceous earth ("Celite"), acidified with 35 ml. conc. hydrochloric acid and cooled immediately for crystallization. The crystals were collected, washed with water, and then recrystallized from the indicated solvent.

$$HO_2C-CH-CH-C-NH-\text{Ar}_{V(a-e)}$$
(with OH, OH, O substituents; X, Y on aromatic ring)

| | X,Y | Cryst. solvent | $[\alpha]_D^{25}(c)$ a | M.P.° C. | Yield, percent |
|---|---|---|---|---|---|
| Va | 2-$NO_2$ | $H_2O$(HCl) b | +89.8° (0.8, $H_2O$) | 196.0–198.0 | 50 |
| Vb | 2,4-diCl | $H_2O$ or HOAc c | +100.7° (1.6) | 182.5–192.5 | 59 |
| Vc | 2-Cl | $H_2O$ | +99.4° (1.6) | 180.5–182.5 | 47 |
| Vd | 4-Cl | Ethanol-$H_2O$ | +108.9° (1.6) | 193.0–195.0 | 85 |
| Ve | 4-Br (hydrate) | do | +90.5° (1.8) | 198.5–201.5 | 67 | a Unless otherwise indicated rotations were taken in 95% ethanol.
b This material sometimes crystallizes containing ~25% potassium salt. Recrystallization from dilute HCl converts to 100% acid.
c This material tends to form a gel on recrystallization. It is recommended that it not be recrystallized.

Example 20

(+)-2'-chlorotartranilic acid.—(+) - 2,3 - diacetoxysuccinic anhydride (21.6 g.; 0.1 mole) and 2-chloraniline (12.8 g.; 0.1 mole) in 100 ml. methylene chloride were heated under reflux for one hour. This solution was treated with a solution of potassium hydroxide (22 g.—86% pellets; 0.32 mole) and the methylene chloride was removed under reduced pressure. The remaining aqueous solution was heated on a steam bath 20 minutes, filtered hot, acidified with 35 ml. conc. hydrochloric acid and cooled to yield 12.1 g. (47%) crystalline (+)-2'-chlorotartranilic acid. Recrystallization from water gave analytical material, M.P. 180.5–182.5°, $[\alpha]_D^{25}$ +99.4 (c. 1.65, 95% ethanol).

Analysis.—Calc'd for $C_{10}H_{10}ClNO_5$: C, 46.26; H, 3.88; N, 5.40. Found: C, 46.22; H, 3.48; N, 5.32.

Example 21

(+)-4'-chlorotartranilic acid.—(+) - 2,3 - diacetoxysuccinic anhydride (22 g.; 0.1 mole) and 4-chloroaniline (15 g.; 0.12 mole) in 150 ml. methylene chloride were stirred together for one hour. This solution was treated with a solution of potassium hydroxide (21 g.—86% pellets; 0.32 mole) in 50 ml. water. This phase system was stirred vigorously for 1 hour. The layers were separated and the organic layer extacted with 1-00 ml. water. The combined aqeous layers were heated to drive off any residual methylene chloride, filtered and acidified with 30 ml. conc. hydrochloric acid. After cooling the crystals were collected to give 24.2 g. (90%) (+)-4'-chlorotartranilic acid. Recrystallization twice from 3:1 water:ethanol gave an analytical sample, M.P. 193.0–195.0°, $[\alpha]_D^{25}$ +108.9° (c. 1.64, 95% ethanol).

Analysis.—Calc'd for $C_{10}H_{10}ClNO_5$: C, 46.26; H, 3.88; N, 5.40. Found: C, 46.65, 46.62; H, 4.04, 4.05; N, 5.34.

Example 22

(+) - 4' - bromotartranilic acid hydrate.—(+) - 2,3-diacetoxysuccinic anhydride (21.6 g.; 0.1 mole) and 4-bromoaniline (17.2 g.; 0.1 mole) were placed with 200 ml. methylene chloride and heated under reflux for 3 hours. This solution was treated with a solution of potassium hydroxide (21 g.—86% pellets; 0.32 mole) in 200 ml. water and stirred vigorously for 10 minutes. The methylene chloride layer was separated and extracted with 100 ml. water. The combined aqueous layers were stirred for 2 hours, warmed, filtered and acidified to give 20.5 g. (67%) crystalline (+)-4'-bromotartranilic acid hydrate. This was recrystallized from ethanol-water with a decolorizing carbon treatment to give 15 g. analytically pure (+)-4'-bromotartranilic acid hydrate, M.P. 198.5–201.5°, $[\alpha]_D^{25}$ +90.5° (c. 1.8, 95% ethanol).

Analysis.—Calc'd for $C_{10}H_{10}BrNO_5 \cdot H_2O$: C, 37.28; H, 3.76; N, 4.35; $H_2O$, 5.59. Found: C, 37.07; H, 3.61; N, 4.32; $H_2O$, 5.68.

USE OF RESOLVING AGENTS

Example 23

Resolution of (±)-6,7-dimethoxy-1-β-hydroxyethyl-2-methyl-1,2,3,4-tetrahydroisoquinoline IIa and b.—To a warm solution of 73.1 g. (0.292 mole) of (±)-6,7-dimethoxy-1-β-hydroxyethyl-2-methyl-1,2,3,4 - tetrahydroisoquinoline in 375 ml. of 95% ethanol was added a warm solution of 39.4 g. (0.146 mole) (+)-2'-nitrotartranilic acid in 375 ml. of 95% ethanol. The crystals (75.9 g.) were collected after storage at 5° C. for 20 hours. One recrystallization from 750 ml. of 80% ethanol gave 69.8 g. (92%) of material, M.P. 193.5–195.5° C.

This material was converted to its free base by neutralization with aqueous sodium carbonate and extraction with ethyl acetate. Concentration of the ethyl acetate extracts gave 30.0 g. of oil. This oil gave a crystalline hydrochloride from isopropanol and 10 ml. of conc. hydrochloric acid. One recrystallization from 150 ml. of absolute ethanol gave 22.3 g. (55%) of (+)-6,7-dimethoxy-1-β-hydroxyethyl-2-methyl-1,2,3,4 - tetrahydroisoquinoline hydrochloride (IIa), M.P. 177–180°, $[\alpha]_D^{25}$ +22.7° (c. 2.05, chloroform).

Analysis.—Calc'd for $C_{14}H_{21}NO_3 \cdot HCl$: C, 58.43; H, 7.71; N, 4.87. Found: C, 58.67; H, 7.81; N, 4.63.

The mother liquor from the original crystallization was concentrated to ⅕ its original volume, and treated with 1.0 g. (+)-2-nitrotartranilic acid in 25 ml. of 95% ethanol. The solution was concentrated to dryness and the resultant oil taken up in ethyl acetate, filtered, washed with aqueous sodium carbonate, dried over anhydrous sodium sulfate, and concentrated to dryness to give 33.6 g. of an oil. This oil gave a crystalline hydrochloride from acetone-dry hydrogen chloride. One recrystallization from 95% ethanol gave 24.4 g. (60%) of (−)-6,7-dimethoxy-1-β-hydroxyethyl-2-methyl-1,2,3,4 - tetrahydroisoquinoline hydrochloride (II-b), M.P. 177–179°, $[\alpha]_D^{25}$ −22.8° (c. 2.02, chloroform).

Analysis.—Calc'd for $C_{14}H_{21}NO_3 \cdot HCl$: C, 58.43; H, 7.71; N, 4.87. Found: C, 58.41; H, 7.81; N, 4.67.

(−)-[2,1-a]azetidino - 6,7 - dimethoxy - 2 - methyl-1,2,3,4 - tetrahydroisoquinolinium - p - bromobenzenesulfonate IIIa.—(+)-6,7-dimethoxy-2-methyl-1,2,3,4-tetrahydroisoquinoline hydrochloride (23.8 g., 0.083 mole) was converted to its free base by neutralization with sodium carbonate and extraction with 200 ml. chloroform. The chloroform extract was dried over sodium sulfate and filtered. This solution was then treated with 23.2 g. (0.091 mole) of p-bromobenzenesulfonyl chloride and stirred for 4 hours at room temperature. Anhydrous sodium carbonate (44 g.) was then added and stirring was continued for 16 hours. The reaction mixture was filtered and the filtrate concentrated to give 38 g. of crude crystalline material. One recrystallization from isopropanol gave 26.8 g. (69%) of analytical material (IIIa), M.P. 178–180°, $[\alpha]_D^{25}$ −115.7° (c. 2.02, chloroform).

Analysis.—Calc'd for $C_{20}H_{24}BrNO_5S$: C, 51.07; H, 5.14; N, 2.98. Found: C, 51.24; H, 5.24; N, 2.85.

(+)-[2,1-a]azetidino - 6,7 - dimethoxy - 2 - methyl-1,2,3,4 - tetrahydroisoquinolinium - p - bromobenzenesulfonate IIIb.—(−)-6,7-dimethoxy-2-methyl-1,2,3,4-tetrahydroisoquinoline hydrochloride (22.6 g., 0.079 mole) was converted to its free base by neutralization with sodium carbonate and extraction with 200 ml. chloroform. The chloroform extract was dried over sodium sulfate and filtered. This solution was then treated with 21.8 g. (0.085 mole) of p-bromobenzenesulfonyl chloride and stirred for 4 hours at room temperature. Anhydrous sodium carbonate (41.5 g.) was added and stirring was continued for 16 hours. The reaction mixture was filtered and the filtrate concentrated to give 39 g. of crude crystalline material. One recrystallization from isopropanol gave 26.0 g. (70.3%) of analytical material, IIIb, M.P. 179.5–180.5°, $[\alpha]_D^{25}$ +114.2° (c. 2.00, chloroform).

Analysis.—Calc'd for $C_{20}H_{24}BrNO_5S$: C, 51.07; H, 5.14; N, 2.98. Found: C, 51.11; H, 5.12; N, 2.75.

(−)-1-(β-p-chlorothiophenoxyethyl) - 6,7 - dimethoxy-2-methyl-1,2,3,4-tetrahydroisoquinoline IVa.—A solution of 0.3 g. (0.0075 mole) of sodium hydroxide and 1.09 g. (0.0075 mole) of p-chlorothiophenol in 30 ml. of absolute ethanol was treated with 3.53 g. (0.0075 mole) of (−)-[2,1-a]azetidino-6,7-dimethoxy - 2 - methyl-1,2,3,4-tetrahydroisoquinolinium-p-bromobenzenesulfonate IIIa and heated on a steam bath for 5 min. The reaction mixture was cooled, diluted with an equal volume of ethyl ether, and filtered. The filtrate was concentrated to an oil which crystallized upon standing. One recrystallization from 95% ethanol gave 1.65 g. (58%) of analytical material (IVa), M.P. 54.5–55.5°, $[\alpha]_D^{25}$ −36.5° (c. 2.05, chloroform).

Analysis.—Calc'd for $C_{20}H_{24}ClNO_2S$: C, 63.56; H, 6.40; N, 3.71. Found: C, 63.71; H, 6.45; N, 3.56.

(+)-1-(β-p-chlorothiophenoxyethyl) - 6,7 - dimethoxy-2-methyl-1,2,3,4-tetrahydroisoquinoline IVb.—A solution of 0.3 g. (0.0075 mole) of sodium hydroxide and 1.09 g. (0.0075 mole) of p-chlorothiophenol in 30 ml. of absolute ethanol was treated with 3.53 g. (0.0075 mole) of (+)-[2,1-a]azetidino - 6,7 - dimethoxy - 2 - methyl-1,2,3,4 - tetrahydroisoquinolinium-p-bromobenzenesulfonate (IIIb) and heated on a steam bath for 5 min. The reaction mixture was cooled, diluted with an equal volume of ethyl ether, and filtered. The filtrate was concentrated to an oil which crystallized upon standing. One recrystallization from 95% ethanol gave 0.85 g. (30%) of analytical material, M.P. 53–54°, $[\alpha]_D^{25}$ +37.0° (c. 1.62, chloroform).

Analysis.—Calc'd for $C_{20}H_{24}ClNO_2S$: C, 63.56; H, 6.40; N, 3.71. Found: C, 63.87; H, 6.48; N, 3.78.

Example 24

Resolution of (±)-1-(β-p-chlorothiophenoxyethyl)-6,7-dimethoxy-2-methyl-1,2,3,4-tetrahydroisoquinoline IV a & b.-(±)-1-β-p-chlorothiophenoxyethyl) - 6,7 - dimethoxy-2-methyl - 1,2,3,4 - tetrahydroisoquinoline (18.7 g., 0.0495 mole) and (+)-2',4'-dichlorotartranilic acid (8.4 g., 0.0286 mole) were taken up in 125 ml. hot ethyl acetate, filtered and cooled for crystallization. The crystals were collected and washed with 25 ml. cold ethyl acetate. The mother liquor was retained for isolation of the (+) isomer. The crystals (15.8 g.) were recrystallized from 125 ml. ethyl acetate to give 14.3 g. pure (−) isomer salt, M.P. 115.5–116.5°, $[\alpha]_D^{25}$ +42.6° (c. 1.8, CHCl₃). This material was shaken with 50 ml. water containing 2.5 g. sodium hydroxide and 50 ml. methylene chloride. The solid material was removed by filtration and the methylene chloride layer was separated. The aqueous layer was extracted once more with methylene chloride. The combined extracts were dried over $K_2CO_3$, filtered through diatomaceous earth ("Celite") and concentrated to dryness to leave colorless oil (7.5 g) which crystallized. Recrystallization of this material from 85% methanol-water gave 4.1 g. pure (−) isomer, M.P. 54.0–55.0°, $[\alpha]_D^{25}$ −38.4° (c. 2.0, CHCl₃). Its infrared spectrum is identical to that of material prepared by Example 23.

This is the (S)-isomer in the nomenclature of Cahn, Ingold and Prelog, Experientia, XII(3), 81–94 (Mar. 15, 1956).

This (S)-isomer was converted to its hydrogen fumarate in the following manner. (−)-1-(β-p-chlorothiophenoxyethyl)-6,7-dimethoxy-2-methyl-1,2,3,4 - tetrahydroisoquinoline (189 mgm.) and fumaric acid (58 mgm.) were taken up in 2.5 ml. hot isopropyl alcohol which on slow cooling to 5° C. deposited crystalline (S)-isomer hydrogen fumarate which was collected by centrifugation, dried, found to weigh 240 mgm., to melt at 136.5–138.5° C. corrected and to exhibit $[\alpha]_D^{25}$ +21.9° (c. 2.04, 95% ethanol).

Analysis.—Calc'd for $C_{20}H_{24}ClNO_2S \cdot C_4H_4O_4$: C, 58.35; H, 5.71; N, 2.84. Found: C, 58.73, 59.49, 57.99, 58.90; H, 5.76, 6.05; 5.57, 5.99; N, 2.79.

The (+) isomer was obtained from the mother liquor of the first crystallization of salt. The ethyl acetate solution was cooled in ice-water bath, treated with decolorizing charcoal, and filtered through celite. This was washed with 50 ml. 10% potassium carbonate, filtered and concentrated to dryness to leave an oil (0.4 g.). This oil was crystallized from mixed lower alkanes ("Skellysolve B") then 85% methanol to give 5.4 g. of material rich in the (+) isomer, $[\alpha]_D^{25}$ +23.2° (c. 2.0, CHCl₃). From the mother liquors of these crystallizations was recovered 2 g. of material which on crystallization from 85% methanol-water yielded pure (+) isomer IVb (1.4 g.), M.P. 53.5–55.0°, $[\alpha]_D^{25}$ +37.8° (c. 1.9, CHCl₃).

This (R)-isomer was converted to its hydrogen fumarate in the following manner. (+)-1-(β-p-chlorothiophenoxyethyl)-6,7-dimethoxy-2-methyl - 1,2,3,4 - tetrahydroisoquinoline (2.00 g., 0.0053 mole) and fumaric acid (0.615 g., 0.0053 mole) were combined and taken up in 35 ml. isopropyl alcohol. The solution was filtered, evaporated to about 30 ml. under a stream of nitrogen and stored at room temperature to permit the crystallization of the R isomer hydrogen fumarate which was collected, dried at 56° C./ 0.05 mm. and found to weigh 2.40 g., to melt at 129.0–131.0° C. corrected and to exhibit $[\alpha]_D^{25}$ −21.8° (c. 2.02, 95% ethanol).

Analysis. — Calc'd for $C_{20}H_{24}ClNO_2S \cdot C_4H_4O_4$: C, 58.35; H, 5.71; N, 2.84. Found: C, 58.20; H, 5.86; N, 3.02.

All or virtually all of the analgesic activity resides in this (R)-isomer, whether it is in the form of the free base or an acid addition salt.

The (R)- and (S)-isomer hydrogen fumarates prepared above have different melting points because they were isolated as different crystalline forms; this is indicated by their infrared absorption spectra which were identical when taken in solution, i.e. in a 9:1 mixture of chloroform and methanol (cf. 2000 cm.⁻¹–1250 cm.⁻¹ region).

Equal weights of (R)- and (S)-isomer hydrogen fumarate were mixed in hot isopropyl alcohol; cooling gave the crystalline racemic hydrogen fumarate of compound IV, M.P. 120.0–121.0° C. corrected, which also had the same infrared absorption spectrum in solution as did a sample of this salt prepared directly from racemic base.

The partially resolved material could be purified as follows. 4 g. $[\alpha]_D^{25}$ +23°) of this material was taken up in 50 ml. isopropanol and treated with 0.5 ml. conc. hydrochloric acid, concentrated to 25 ml. and cooled. The crystalline material was removed by filtration (racemic HCl salt). The filtrate was concentrated, taken up in ethyl acetate, filtered, washed with dilute sodium carbonate, dried over sodium sulfate and concentrated to dryness. This residue was crystallized from 85% methanol-water to yield pure (+) isomer (IVb) (1.2 g.), M.P. 53.0–55.0°, $[\alpha]_D^{25}$ +37.5° (c. 1.9, CHCl₃). The infrared spectra of these two samples are identical to that of material prepared by Example 23.

While in the foregoing specification various embodiments of this invention have been set forth in specific detal and elaborated for the purpose of illustration, it will be apparent to those skilled in the art that this invention is susceptible to other embodiments and that many of the details can be varied widely without departing from the basic concept and the spirit and scope of the invention.

I claim:

1. A member selected from the group consisting of compounds of the formula

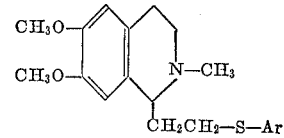

wherein Ar is a member selected from the group consisting of

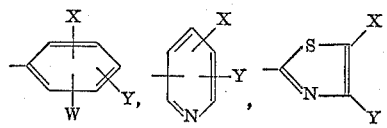

and

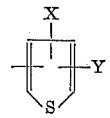

wherein W, X and Y are each a member selected from the group consisting of hydrogen, chloro, bromo, fluoro, trifluoromethyl, methyl, ethyl, methoxy and ethoxy, and nontoxic, pharmaceutically acceptable acid addition salts thereof.

2. A compound of claim 1 having the formula

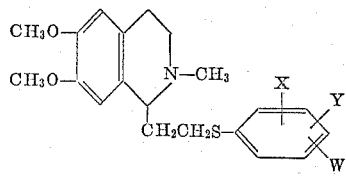

wherein W, X and Y are each a member selected from the group consisting of hydrogen, chloro, bromo, fluoro, trifluoromethyl, methyl, ethyl, methoxy and ethoxy and nontoxic, pharmaceutically acceptable acid addition salts thereof.

3. A compound of claim 1 having the formula

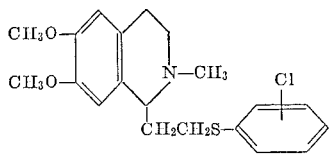

and nontoxic, pharmaceutically acceptable acid addition salts thereof.

4. A compound of claim 1 having the formula

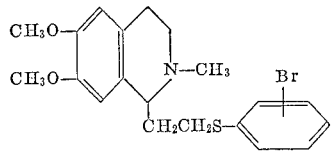

and nontoxic, pharmaceutically acceptable acid addition salts thereof.

5. A compound of claim 1 having the formula

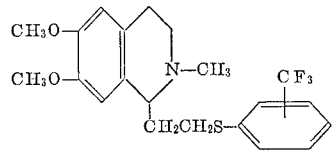

and nontoxic, pharmaceutically acceptable acid addition salts thereof.

6. A compound of claim 1 having the formula

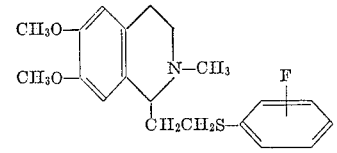

and nontoxic, pharmaceutically acceptable acid addition salts thereof.

7. A compound of claim 1 having the formula

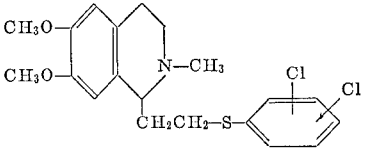

and nontoxic, pharmaceutically acceptable acid addition salts thereof.

8. A compound of claim 1 having the formula

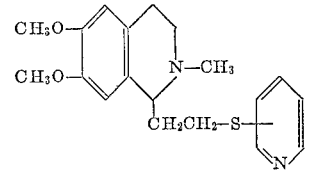

and nontoxic, pharmaceutically acceptable acid addition salts thereof.

9. The compound of claim 1 having the formula

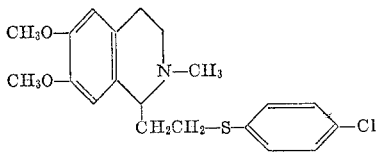

and nontoxic, pharmaceutically acceptable acid addition salts thereof.

10. The compound of claim 1 having the formula

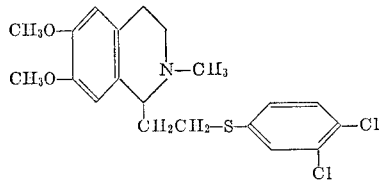

and nontoxic, pharmaceutically acceptable acid addition salts thereof.

11. A compound of the formula

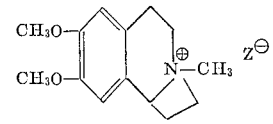

wherein $Z^{\ominus}$ represents one equivalent of an inert anion.

12. A compound of claim 11 having the formula

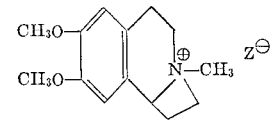

wherein $Z^{\ominus}$ represents a halide ion.

13. A compound of claim 11 having the formula

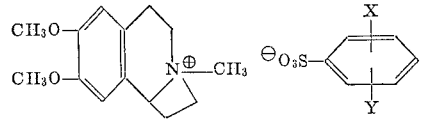

wherein X and Y are each hydrogen, chloro, bromo, fluoro, trifluoromethyl, nitro, (lower)alkyl or (lower)alkoxy.

14. The compound of claim 11 having the formula

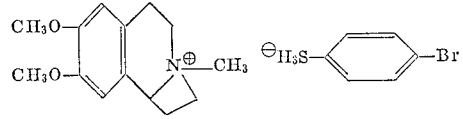

References Cited

UNITED STATES PATENTS

| | | | |
|---|---|---|---|
| 2,995,557 | 8/1961 | Brossi et al. | 260—289 |
| 3,038,896 | 6/1962 | Habicht et al. | 260—288 X |
| 3,042,671 | 7/1962 | Lombardino | 260—287 X |
| 2,683,146 | 7/1954 | Robinson | 260—286 |
| 3,067,203 | 12/1962 | Besendorf et al. | |
| 3,128,226 | 4/1964 | Rubin et al. | 167—55 |
| 3,133,926 | 5/1964 | Kuehne. | |

FOREIGN PATENTS 926,493  5/1963  Great Britain.

OTHER REFERENCES

Brossi et al., Helv. Chim, Acta 43, 1459–1472 (1960).
Brossi et al., Helv. Chim, Acta 44, 1558–1565 (1961).
Walter et al., Helv. Chim, Acta 46, 1127–1132 (1963).
Craig et al., J. Amer. Chem. Soc. 70, 2783–2785 (1948).

Progress in Medicinal Chemistry 2, edited by G. P. Ellis and G. B. West, Butterworth Inc., Washington, D.C. (1962), pp. 79, 80 and 87.

ALEX MAZEL, *Primary Examiner.*

D. DAUS, *Assistant Examiner.*

UNITED STATES PATENT OFFICE
CERTIFICATE OF CORRECTION

Patent No. 3,378,561                          April 16, 1968

Thomas A. Montzka

It is hereby certified that error appears in the above numbered patent requiring correction and that the said Letters Patent should read as corrected below.

Column 2, lines 33 to 40, the formula should appear as shown below:

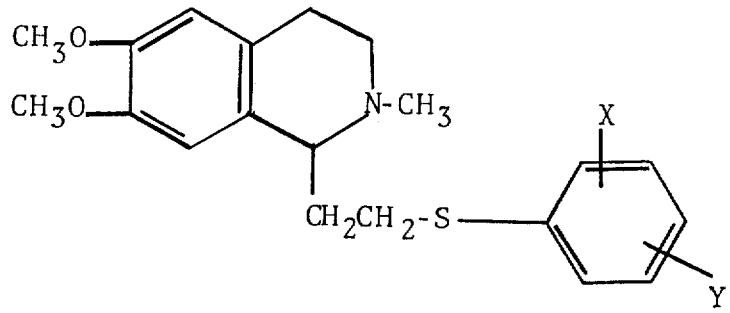

line 62, "aliphtic" should read -- aliphatic --. Column 3, lines 45 to 50, the formula should appear as shown below:

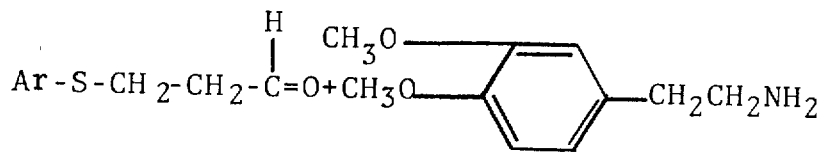

Column 4, line 31, after "sulfate" insert -- and --. Column 9, lines 68 to 75, the formula should appear as shown below:

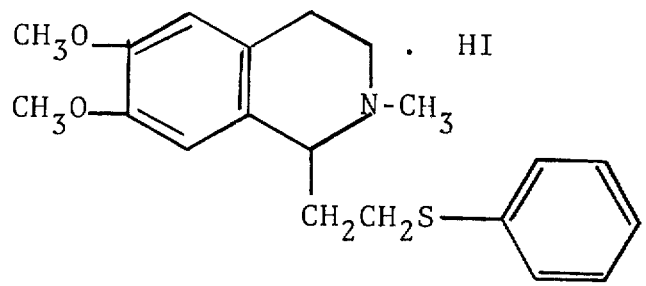

Column 14, line 56, "art" should read -- are --. Column 15, line

45, "mother liquid" should read -- mother liquor --. Column 16, lines 36 to 43, the formula should appear as shown below:

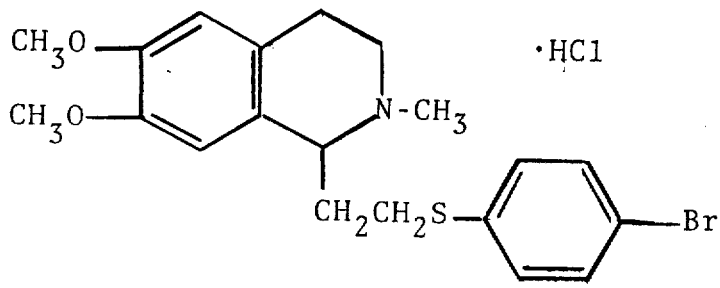

Column 18, line 51, cancel "oxy-2-methyl—1,2,3,4-tetrahydroquinoline" should read -- oxy-2-methyl—1,2,3,4-tetrahydroisoquinoline --. Column 22, line 64, "2-chloraniline" should read -- 2-chloroaniline --. Column 23, line 9, "This phase system was" should read -- This two phase system was --; line 11, "1-00 ml. water" should read -- 100 ml. water --. Column 25, line 49, "(0.4 g.)" should read -- (9.4 g.) --. Column 26, line 28, "detal" should read -- detail --. Column 28, lines 40 to 45, the formula should appear as shown below:

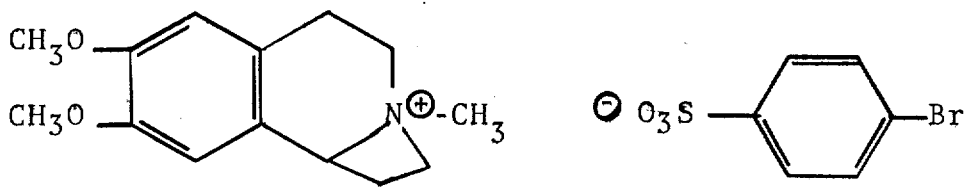

Signed and sealed this 16th day of September 1969.

(SEAL)
Attest:

EDWARD M. FLETCHER, JR.
Attesting Officer

WILLIAM E. SCHUYLER, JR.
Commissioner of Patents